(12) United States Patent
Kato et al.

(10) Patent No.: US 7,801,007 B2
(45) Date of Patent: Sep. 21, 2010

(54) INFORMATION RECORDING MEDIUM, AND INFORMATION RECORDING APPARATUS AND METHOD

(75) Inventors: Masahiro Kato, Tokorozawa (JP); Tsuyoshi Namiki, Tokorozawa (JP); Takeshi Koda, Tokorozawa (JP); Keiji Katata, Tokorozawa (JP); Masami Oishi, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 971 days.

(21) Appl. No.: 11/597,402

(22) PCT Filed: May 23, 2005

(86) PCT No.: PCT/JP2005/009387

§ 371 (c)(1),
(2), (4) Date: Nov. 24, 2006

(87) PCT Pub. No.: WO2005/116996

PCT Pub. Date: Dec. 8, 2005

(65) Prior Publication Data

US 2007/0223343 A1    Sep. 27, 2007

(30) Foreign Application Priority Data

May 27, 2004  (JP) .............................. 2004-157784

(51) Int. Cl.
*G11B 7/00* (2006.01)
(52) U.S. Cl. ..................................... 369/94; 369/53.13
(58) Field of Classification Search .................. None
See application file for complete search history.

(56) References Cited

U.S. PATENT DOCUMENTS

| 5,881,032 A * | 3/1999 | Ito et al. ..................... 369/30.1 |
| 7,539,113 B2 * | 5/2009 | Kuroda et al. ................. 369/94 |
| 2002/0048242 A1 * | 4/2002 | Yamamoto ............... 369/47.51 |

FOREIGN PATENT DOCUMENTS

| JP | 9-231613 | 9/1997 |
| JP | 2000-311346 | 11/2000 |
| JP | 2001-23237 | 1/2001 |
| JP | 2002-216361 | 8/2002 |

* cited by examiner

*Primary Examiner*—Joseph Haley
(74) *Attorney, Agent, or Firm*—Young & Thompson

(57) ABSTRACT

An information recording medium includes at least a disc-shaped first recording layer having a first recording track formed for recording record information and a disc-shaped second recording layer having a second recording track formed for recording the record information in the same recording direction as the first recording track of the first recording layer. A second place serving as a reference of a pre-format address for indicating the start position of the data area in the second recording track (position of a circle of address 30000$h$ in the radius direction in the L1 layer) is located at an outer side as compared to a first position serving as the pre-format address for indicating the start position of the data area in the first recording track (position of a circle of address 30000$h$ in the radius direction in the L0 layer) at least by a predetermined first offset amount.

4 Claims, 26 Drawing Sheets

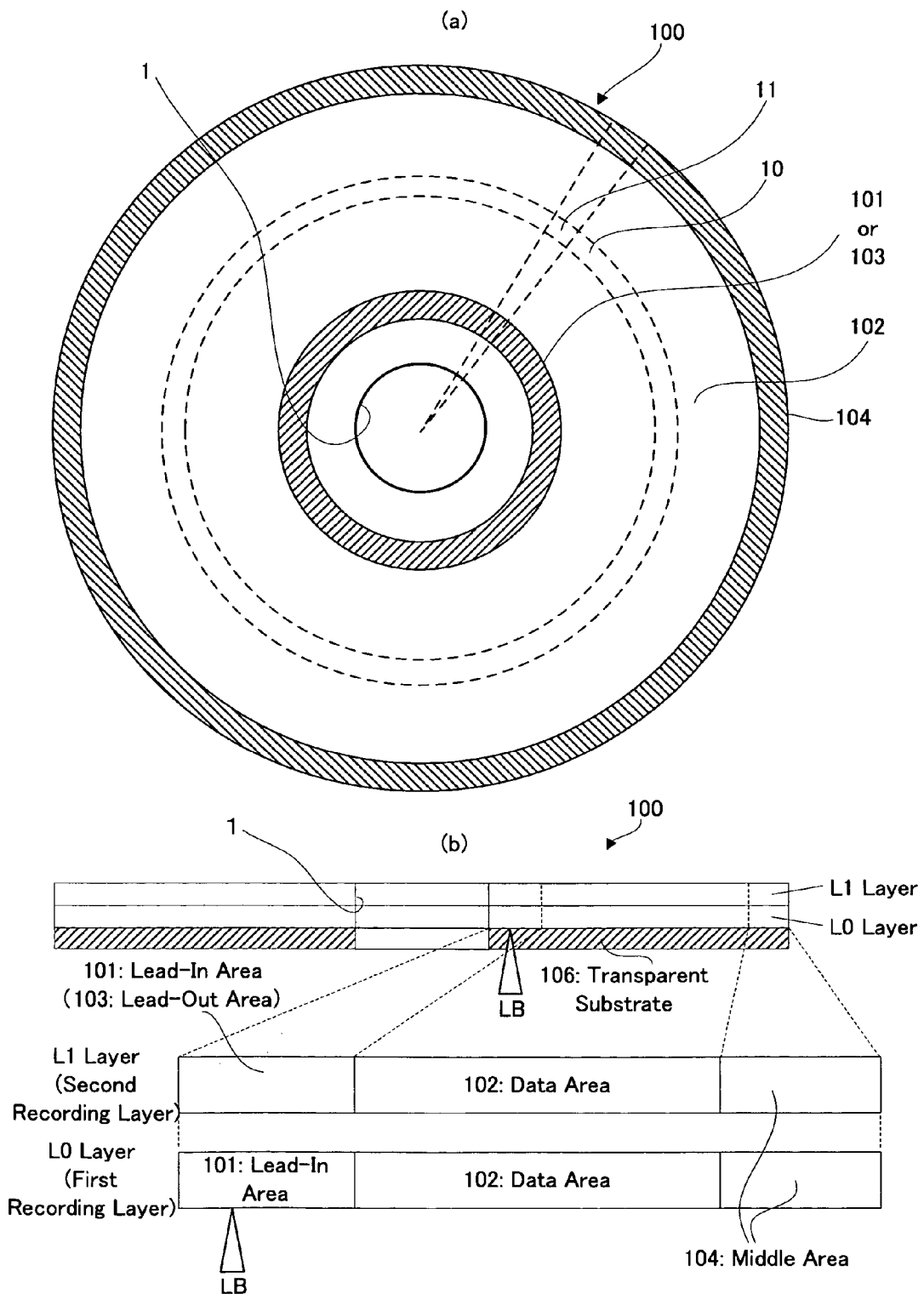
[FIG. 1]

[FIG. 2]
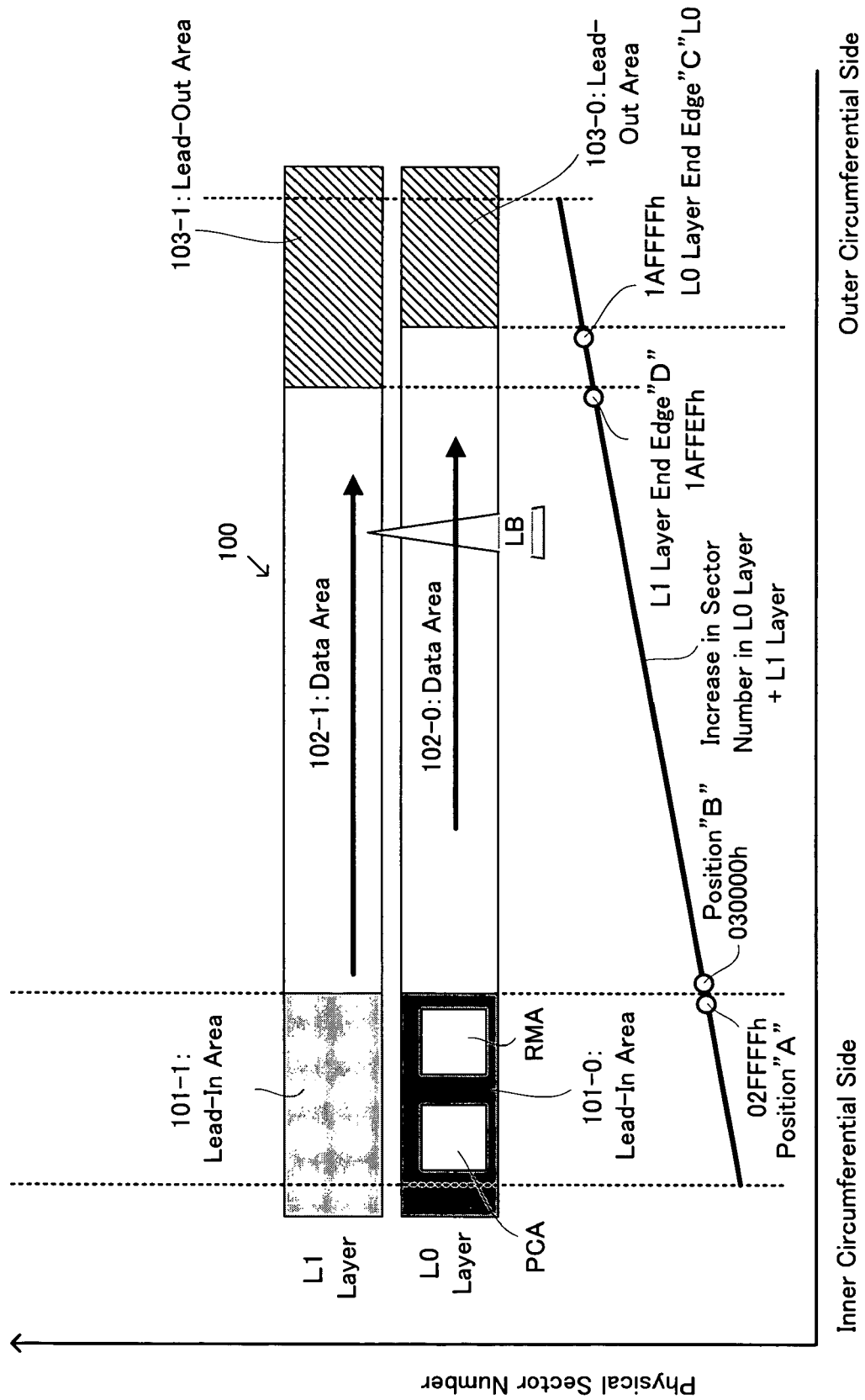

[FIG. 3]
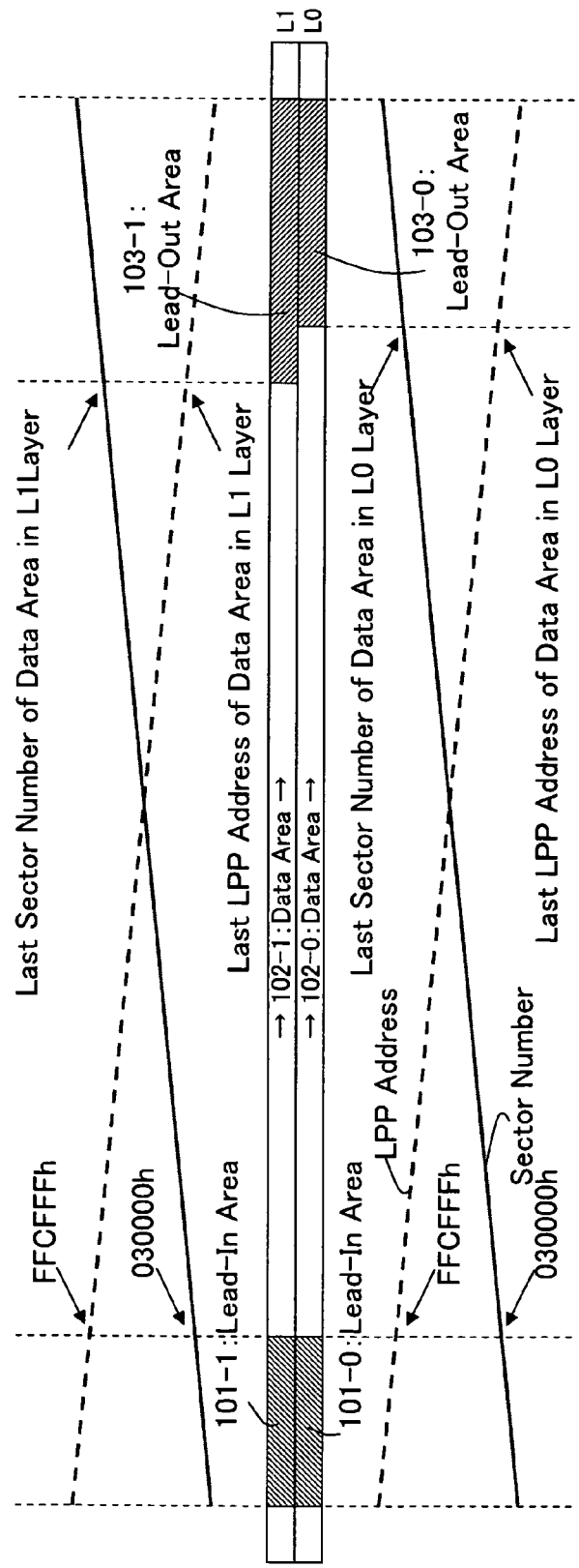

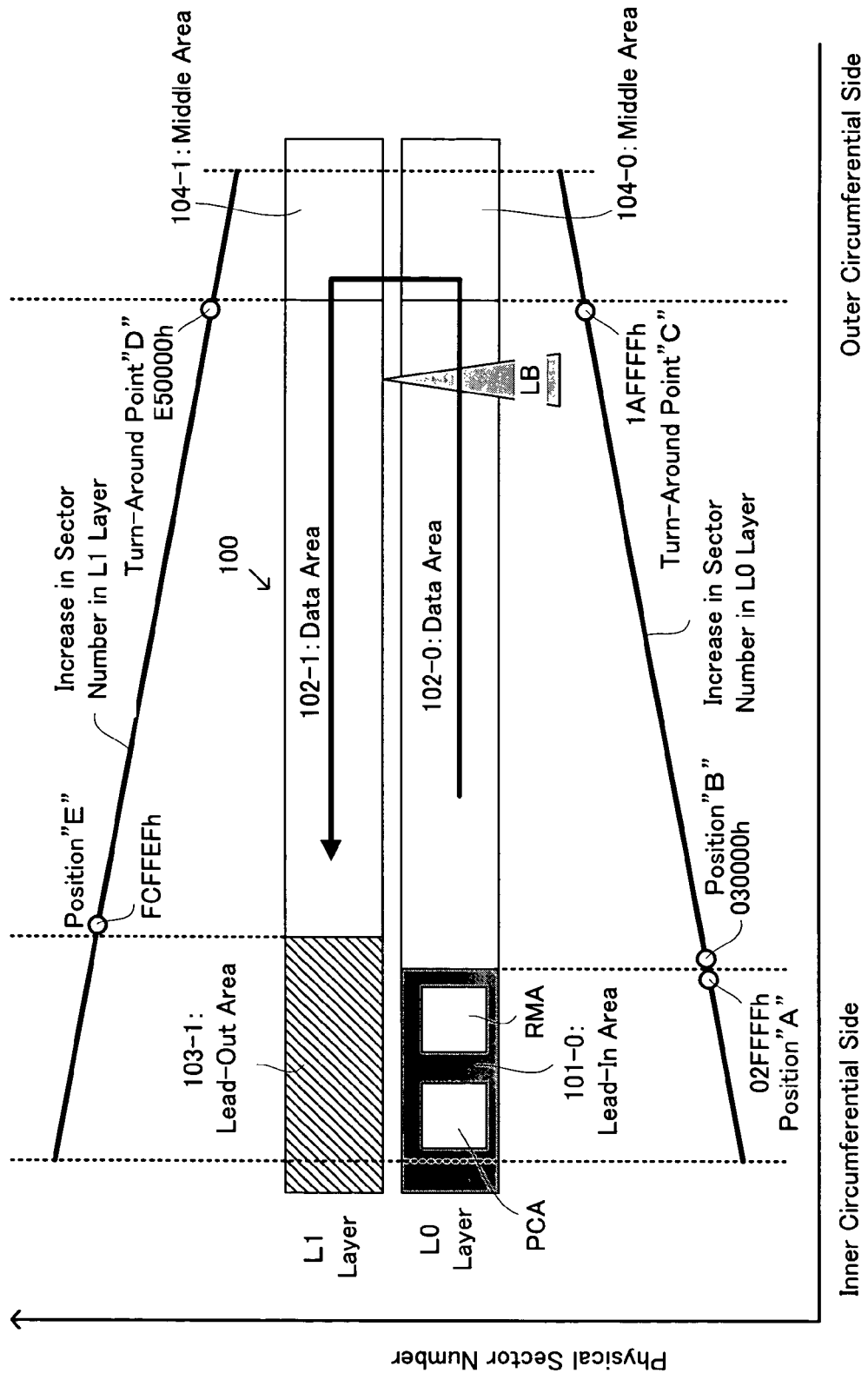
[FIG. 4]

[FIG. 5]
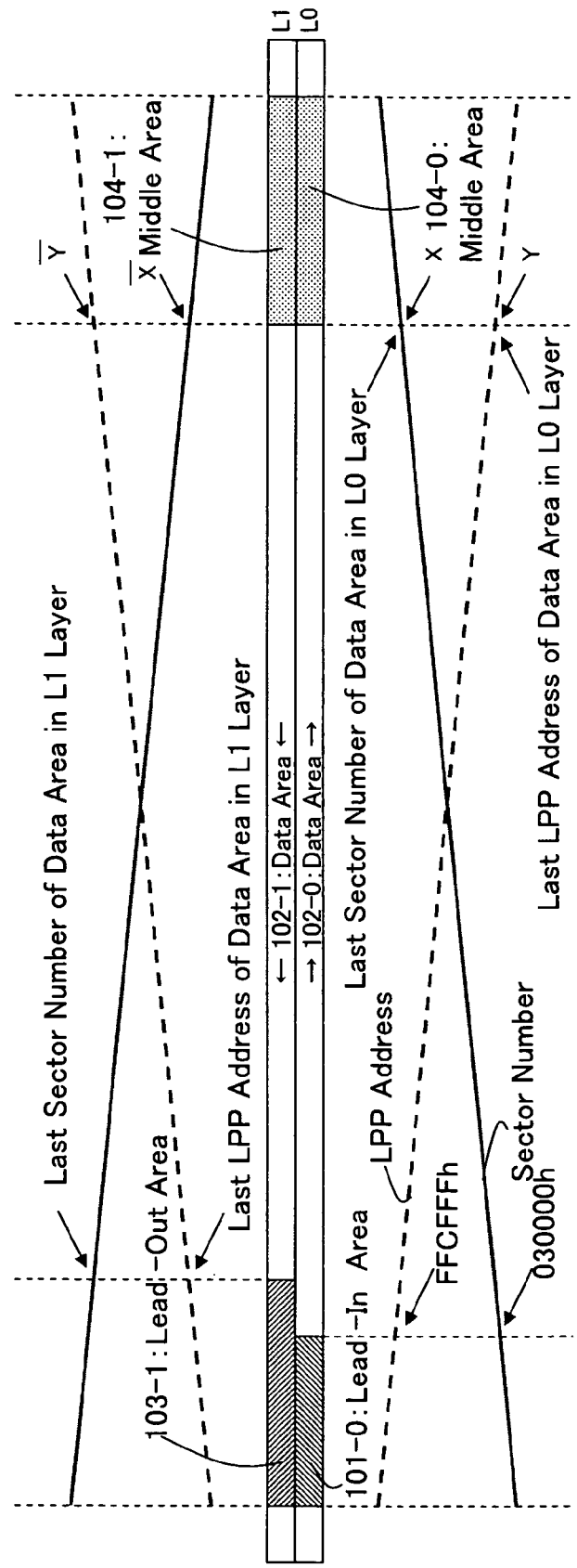

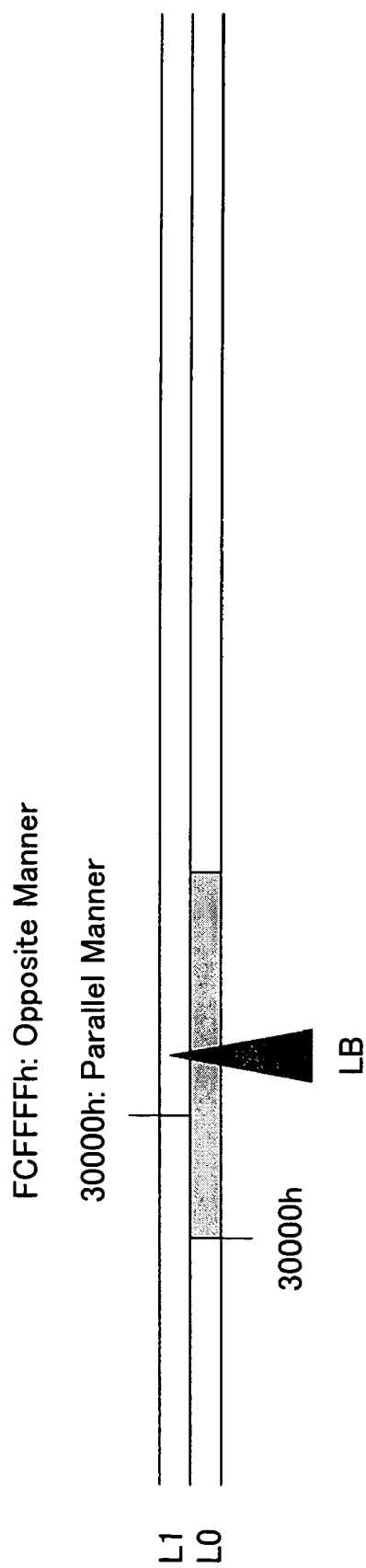
[FIG. 6]

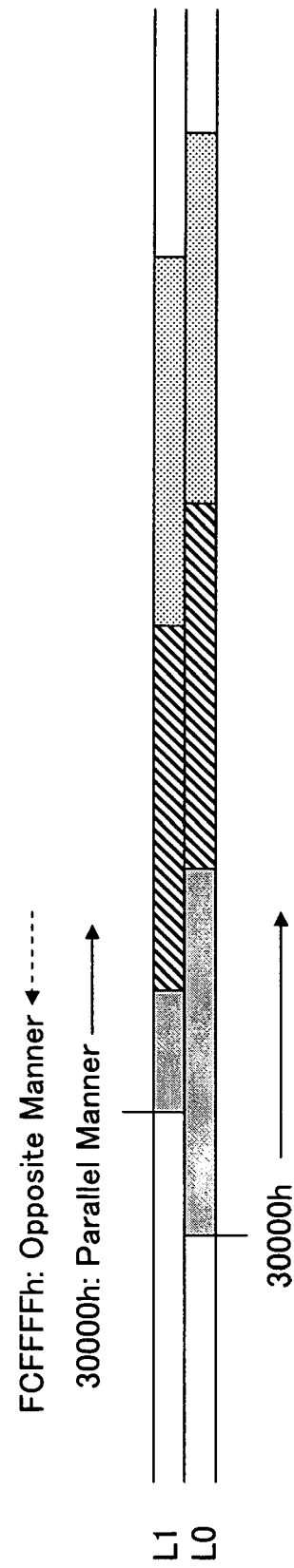
[FIG. 7]

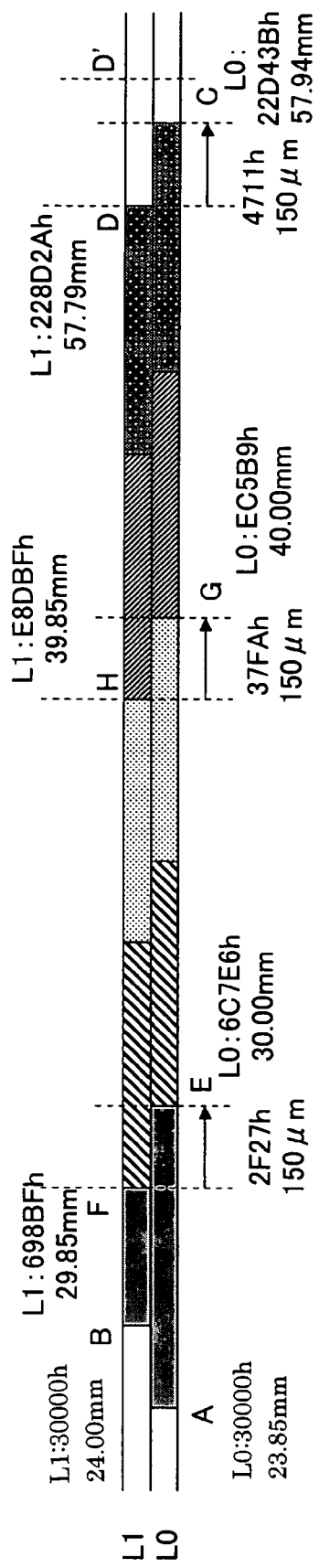
[FIG. 8]

[FIG. 9]
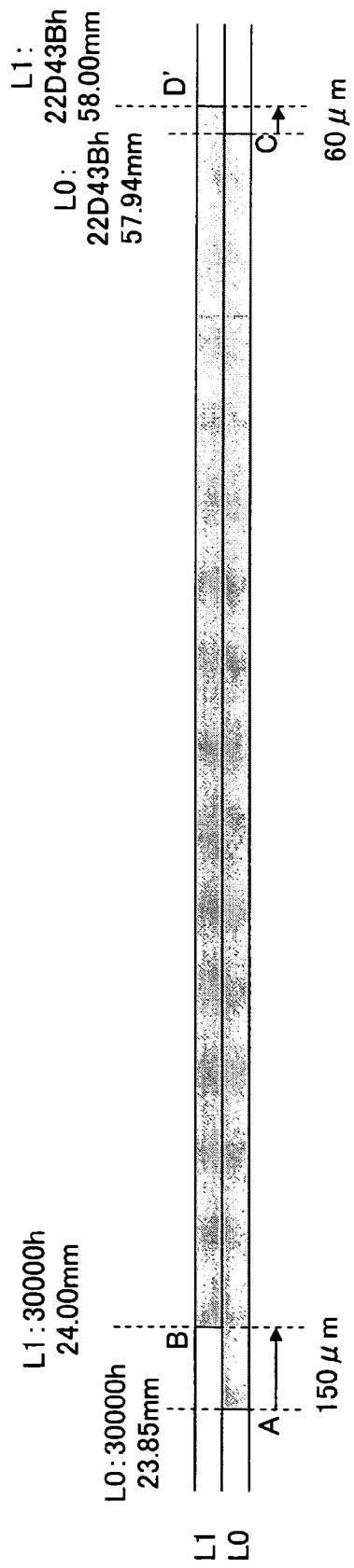

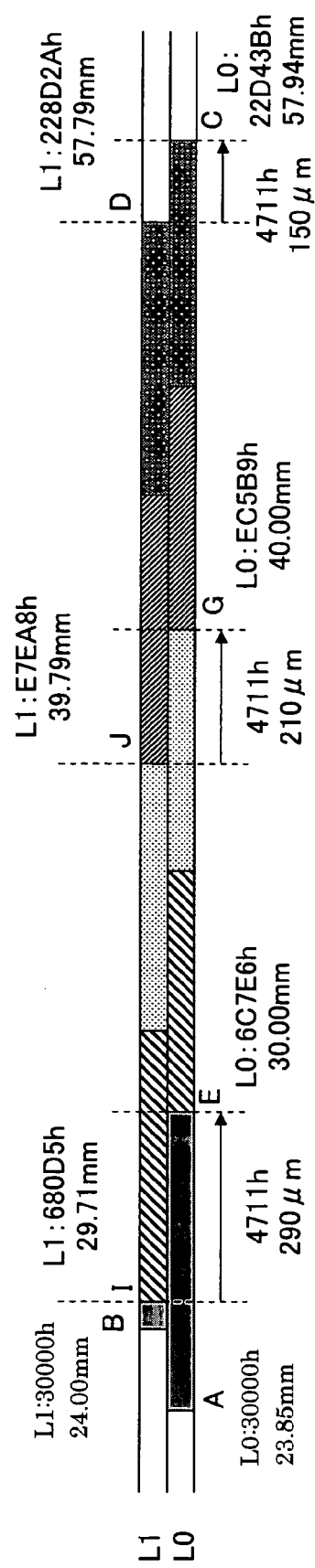
[FIG. 10]

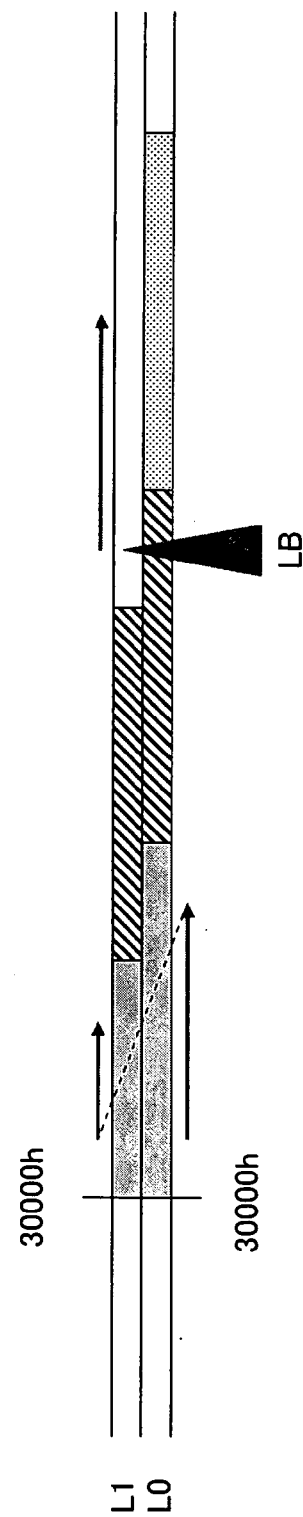
[FIG. 11]

[FIG. 12]
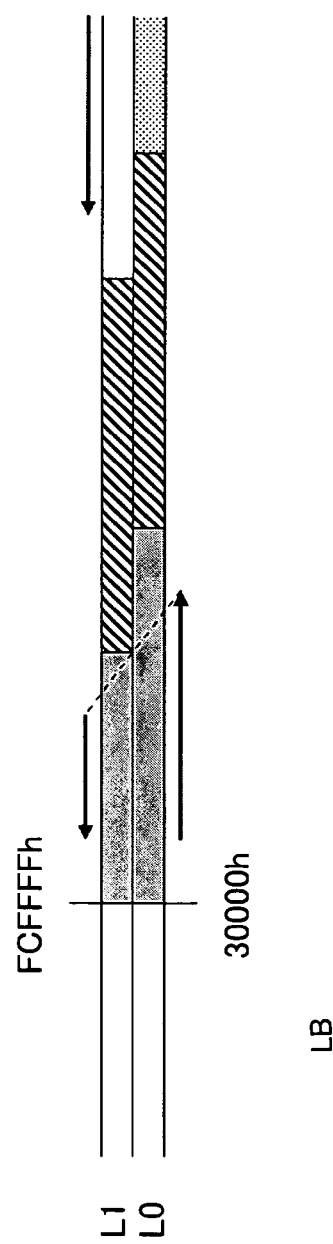

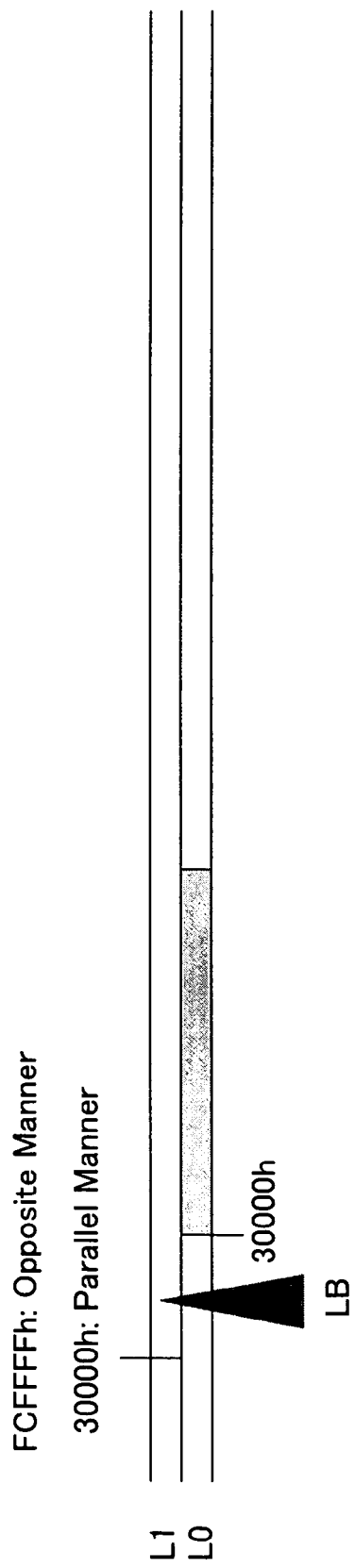
[FIG. 13]

[FIG. 14]
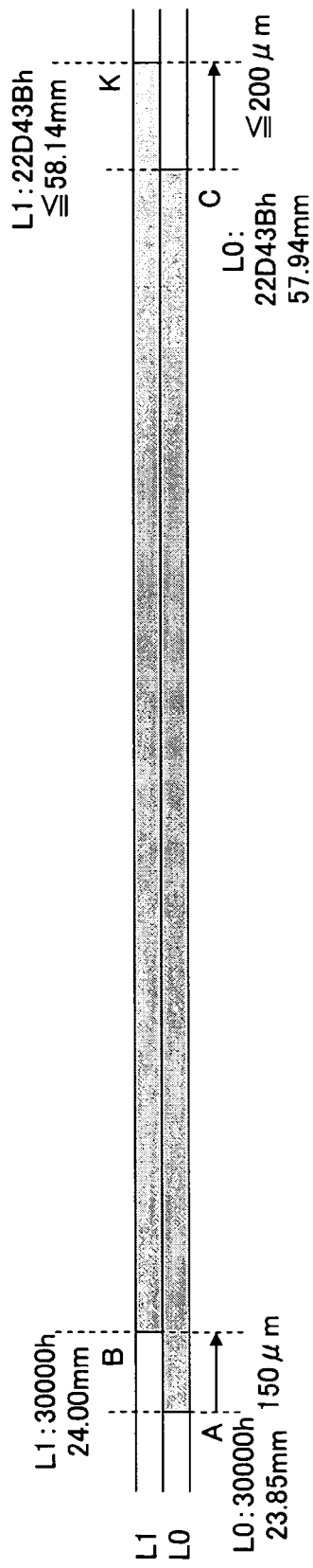

[FIG. 15]
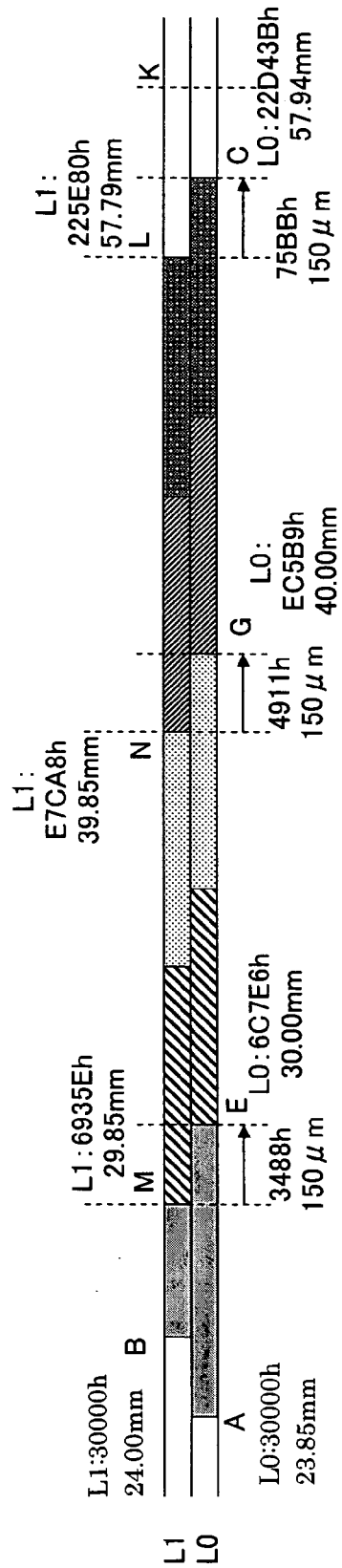

[FIG. 16]
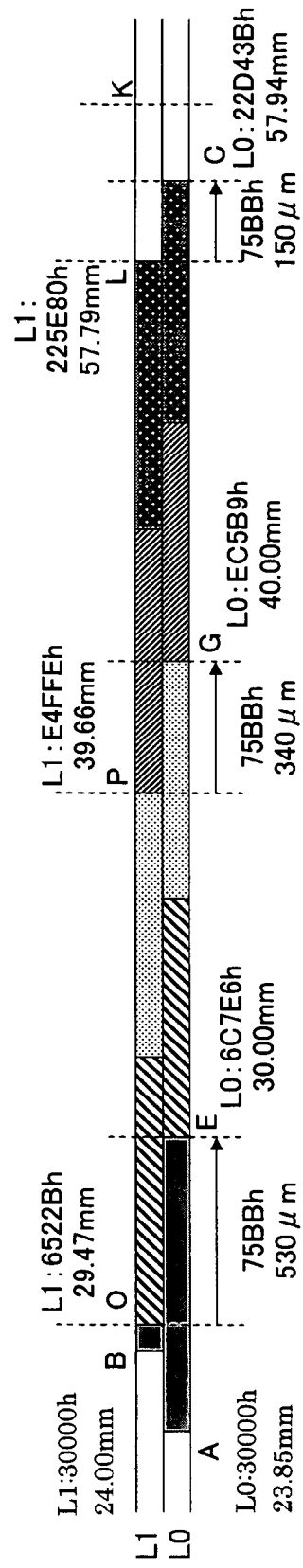

[FIG. 17]
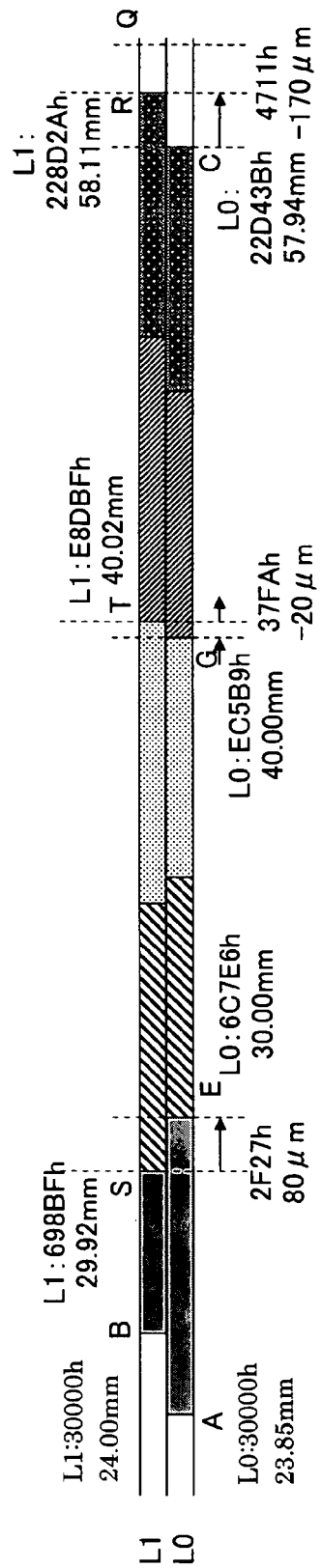

[FIG. 18]
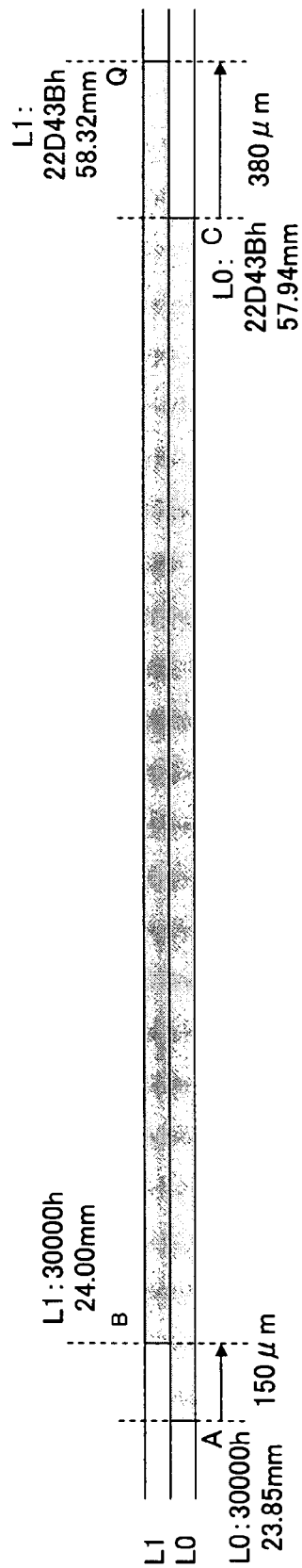

[FIG. 19]
(a)
Relationship of Radial Position to Address Value (Track pitch = 0.74 μm, 0.75 μm)
| Address Value [XEX] | Radius [mm] Tp = 0.74 μm | Radius [mm] Tp = 0.75 μm | Difference in Radial Position [mm] |
|---|---|---|---|
| 20000h | 22.100 | 22.073 | −0.027 |
| 40000h | 25.760 | 25.783 | 0.023 |
| 60000h | 28.962 | 29.023 | 0.061 |
| 80000h | 31.843 | 31.936 | 0.093 |
| a0000h | 34.484 | 34.604 | 0.120 |
| c0000h | 36.937 | 37.081 | 0.144 |
| e0000h | 39.237 | 39.402 | 0.165 |
| 100000h | 41.409 | 41.594 | 0.185 |
| 120000h | 43.473 | 43.677 | 0.204 |
| 140000h | 45.443 | 45.664 | 0.221 |
| 160000h | 47.331 | 47.568 | 0.237 |
| 180000h | 49.147 | 49.400 | 0.253 |
| 1a0000h | 50.898 | 51.165 | 0.267 |
| 1c0000h | 52.591 | 52.872 | 0.281 |
| 1e0000h | 54.231 | 54.525 | 0.294 |
| 200000h | 55.823 | 56.130 | 0.307 |
| 220000h | 57.371 | 57.689 | 0.318 |
| 240000h | 58.878 | 59.208 | 0.330 |
(b)
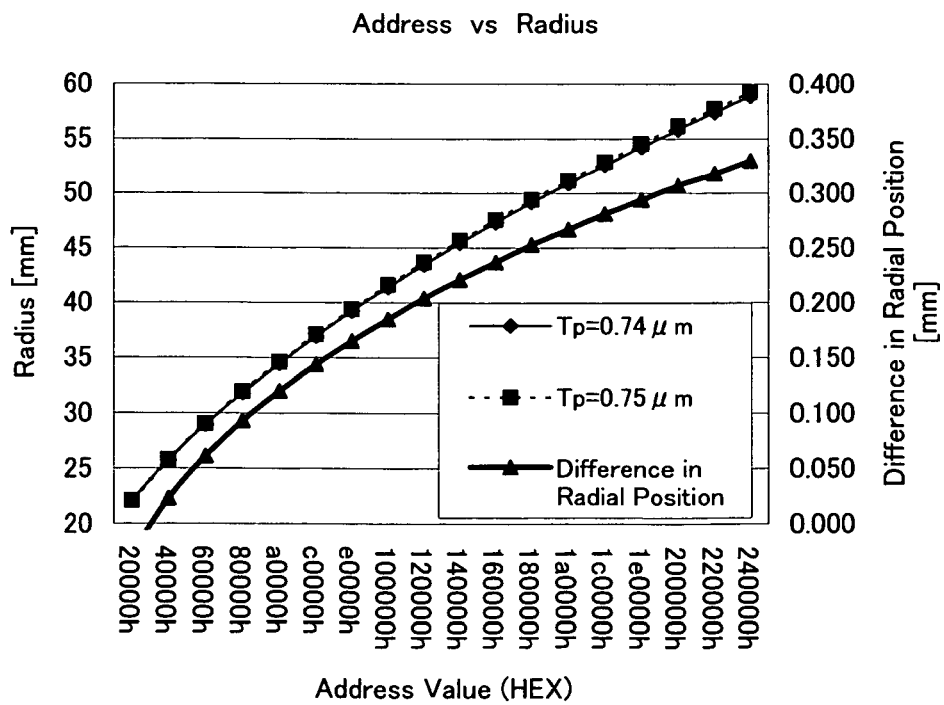

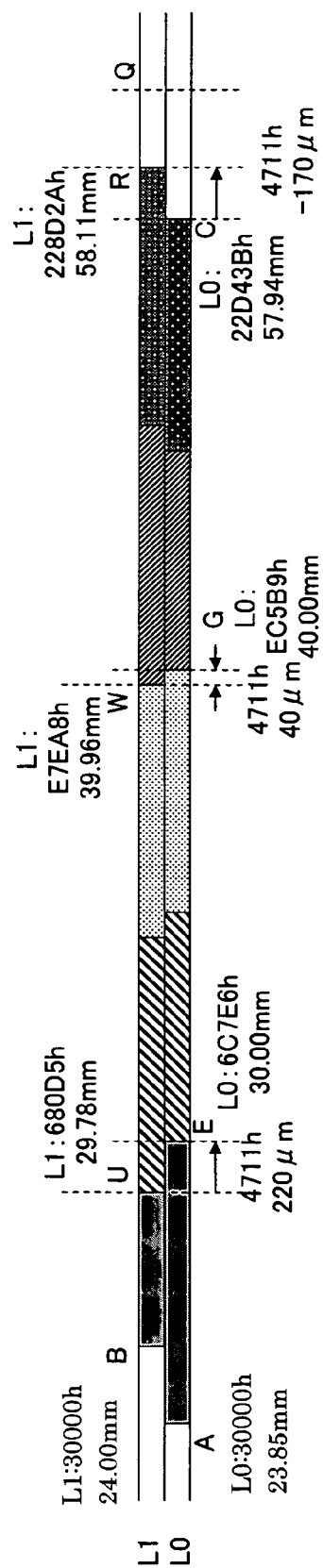
[FIG. 20]

[FIG. 21]
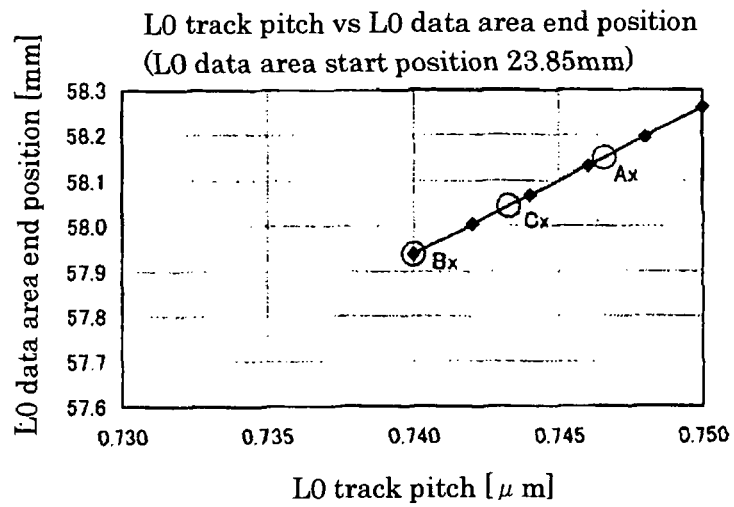
[FIG. 22]
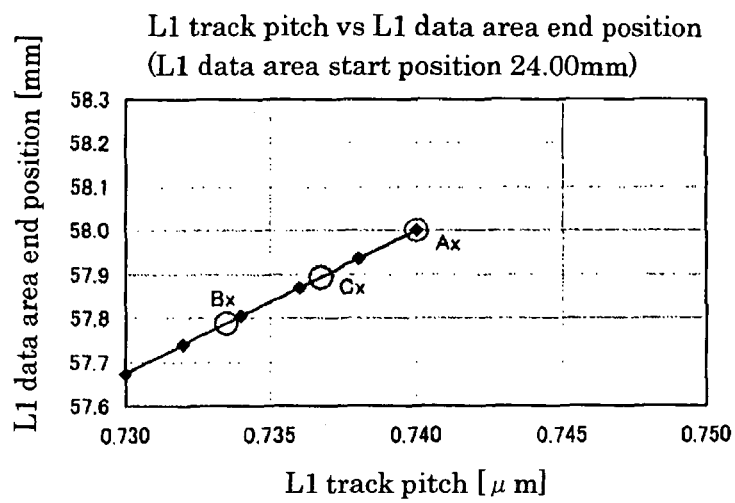
[FIG. 23]
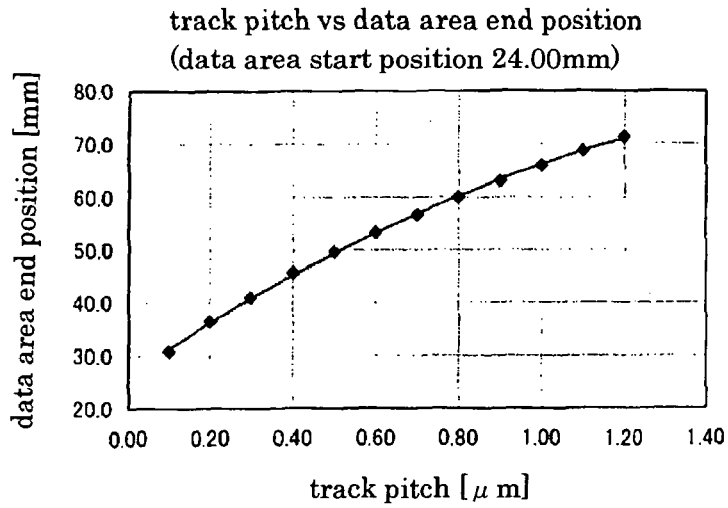

[FIG. 24]
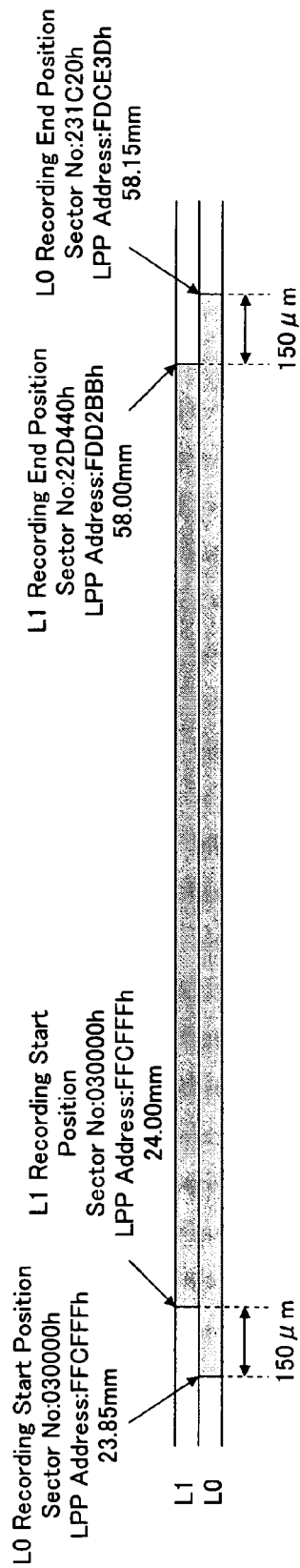

[FIG. 25]
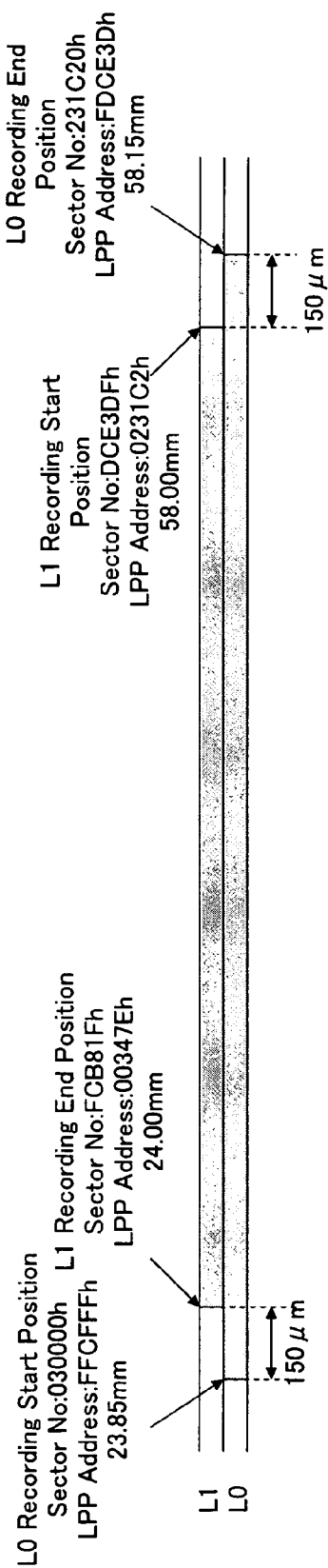

[FIG. 26]
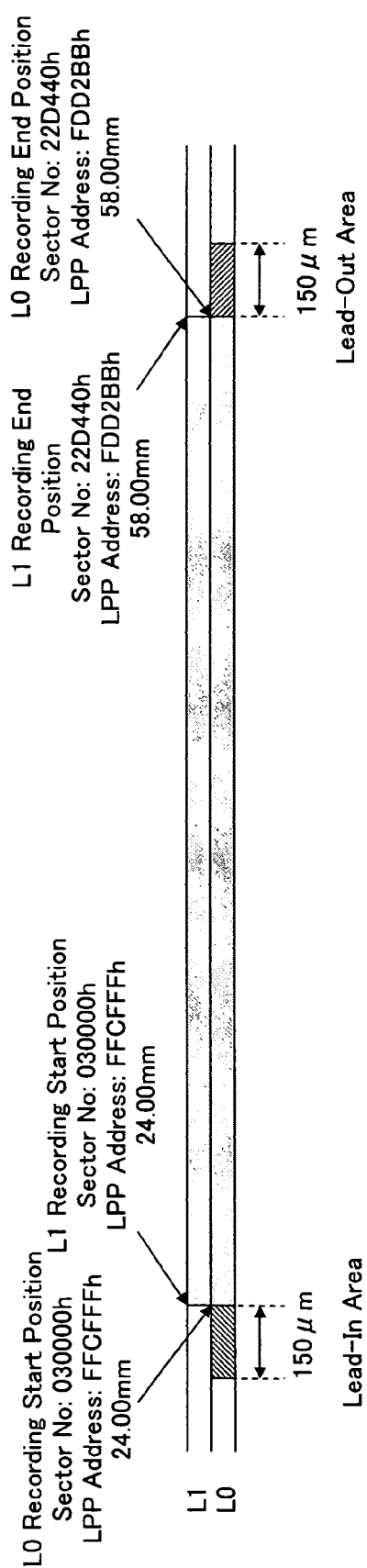

[FIG. 27]
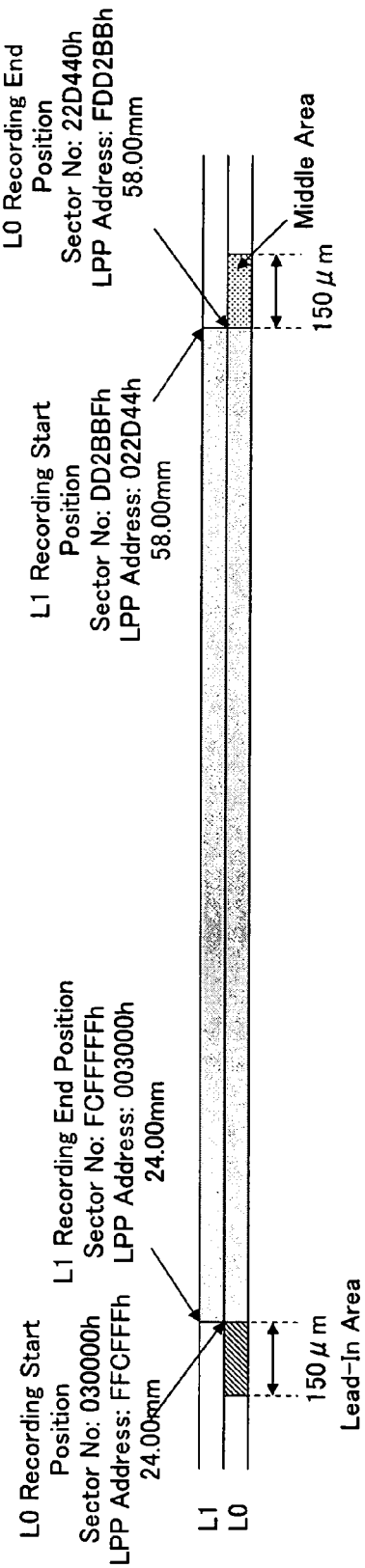

[FIG. 28]
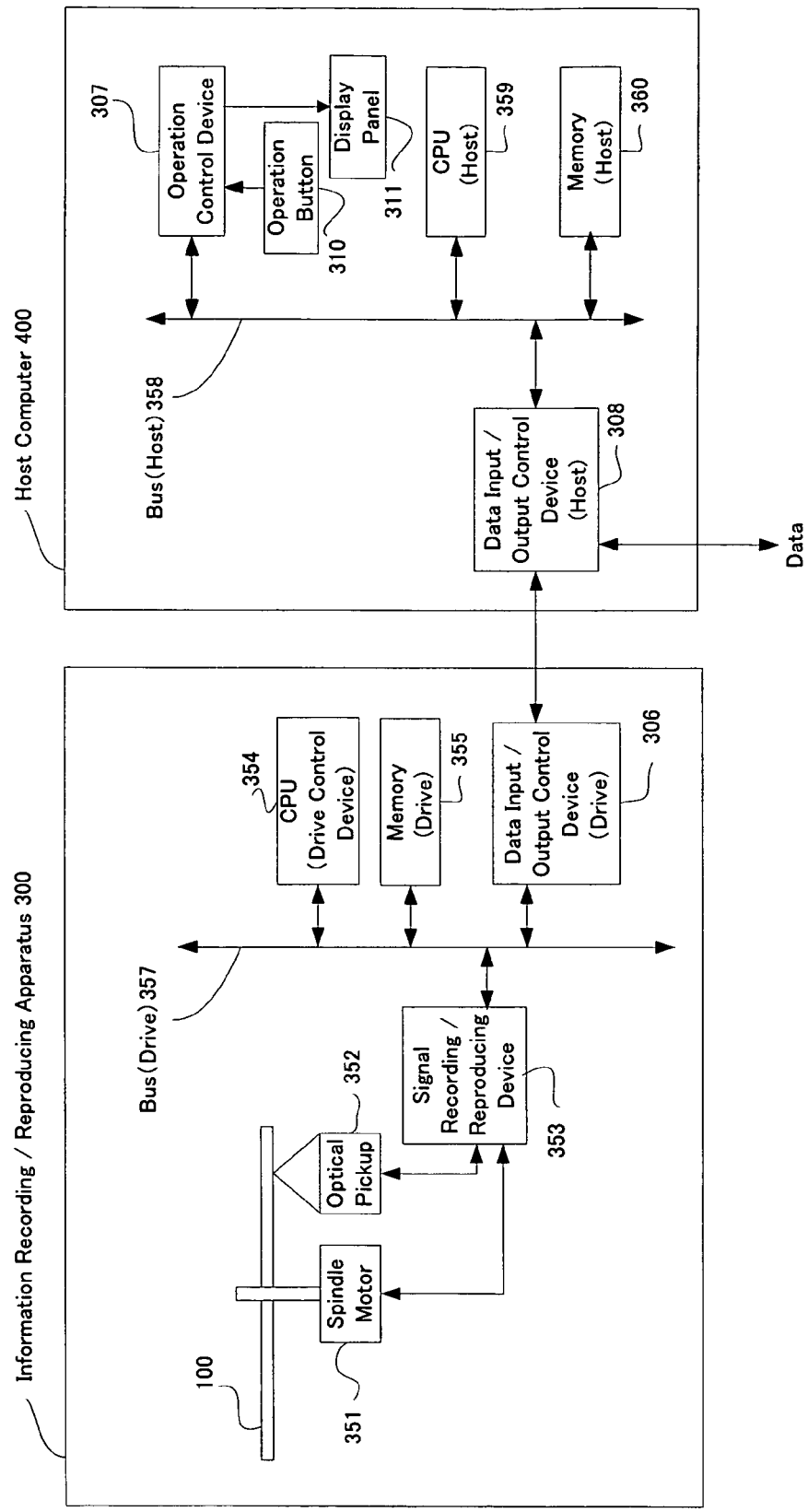

INFORMATION RECORDING MEDIUM, AND INFORMATION RECORDING APPARATUS AND METHOD

TECHNICAL FIELD

The present invention relates to an information recording medium, such as a DVD and a Compact Disc (CD), and an apparatus for and a method of recording information onto such an information recording medium.

BACKGROUND ART

For example, with respect to an information recording medium, such as a Compact Disc-Read Only Memory (CD-ROM), a Compact Disc-Recordable (CD-R), and a DVD-ROM, an information recording medium, such as an optical disc, of a multi-layer type or of a dual-layer-type in which a plurality of recording layers are laminated or pasted on the same substrate has also been developed, as described in patent documents 1 and 2 and the like. Moreover, on an information recording apparatus, such as a DVD recorder, which records information onto such a dual-layer type optical disc, i.e. a two-layer type optical disc, laser light for recording is focused on a recording layer which is on the nearest side observed from the irradiation side of the laser light (i.e. on the closest side to an optical pickup) (wherein the recording layer is referred to as a "L0 layer", as occasion demands). By this, the information recording apparatus records the information into the L0 layer in an irreversible change recording method by heat or in a rewritable method. Moreover, the laser light is focused on a recording layer which is on the back of the L0 layer observed from the irradiation side of the laser light (i.e. on the farthest side from the optical pickup), through the L0 layer and the like (wherein the recording layer is referred to as a "L1 layer", as occasion demands). By this, the information recording apparatus records the information into the L1 layer in the irreversible change recording method by heat or in the rewritable method.

patent document 1: Japanese Patent Application Laid Open NO. 2000-311346 patent document 2: Japanese Patent Application Laid Open NO. 2001-23237

DISCLOSURE OF INVENTION

Subject to be Solved by the Invention

In the two-layer type optical disc, if the data is recorded into the L1 layer, it is required that the laser light is emitted to the L1 layer through the L0 layer. In this case, the record data may be or may not be recorded in the L0 layer through which the laser light is emitted. As described above, the recording state of the L0 layer is not necessarily unified or standardized, and the condition of the laser light with which the L1 layer is irradiated changes depending on the recording state of the L0 layer. Thus, the inventors of the present invention also suggests such a method that the record data is properly recorded into the L1 layer by making the L0 layer in a recorded condition in advance.

However, in the production of the two-layer type information recording medium described above, the L0 layer and the L1 layer are formed separately by using different stampas (i.e. stampa discs), and the substrates of the L0 layer and the L1 layer are pasted lastly. Thus, there is a possibility that an error in pasting may cause an eccentricity in the L0 layer and the L1 layer. Alternatively, since the L0 layer and the L1 layer are formed by using different stampas, that may cause deviation in a track pitch in each of the recording layers. For these reasons, a shift or displacement occurs between a position of one recording area of the L0 layer and a position of another recording area of the L1 layer that corresponds to the one recording area of the L0 layer, which is indicated by position information, such as a pre-format address. Thus, there is such a technical problem that the laser light is not always emitted to the another recording area of the L1 layer, through the one recording area, which is in the recorded condition, of the L0 layer.

It is therefore an object of the present invention to provide an information recording medium which allows the proper recording of information even if it has a plurality of recording layers, for example, as well as an information recording apparatus and an information recording method.

Means for Solving the Subject (Information Recording Medium)

The information recording medium of the present invention will be explained hereinafter.

The above object of the present invention can be achieved by a first information recording medium provided with: a first recording layer in a disc shape, in which a first recording track is formed to record thereon record information; and a second recording layer in a disc shape, in which a second recording track is formed to record thereon the record information through said first recording layer in a same direction as that of the first recording track in said first recording layer, a second position being positioned on an outer circumferential side, at least only by a first offset amount set in advance, from a first position, the second position (a position in the radial direction of a circumference with an address of 30000h in an L1 layer) being a reference of a pre-format address for indicating a start position of a data area in the second recording track, the first position (a position in the radial direction of a circumference with an address of 30000h in an L0 layer) being a reference of the pre-format address for indicating a start position of a data area in the first recording track.

According to the first information recording medium of the present invention, it is, for example, a DVD or an optical disc of a two-layer type or a multi-layer type, in which the first and second recording layers are formed on one surface of a disc-shaped substrate. In the first recording layer, the record information, such as audio information, video information, or content information, can be recorded along the first recording track which is provided with a groove (a guiding groove). In the second recording layer, the record information, such as audio information, video information, or content information, can be recorded along the second recording track which is provided with a groove (a guiding groove). By such construction, the substrate, the first recording layer, and the second recording layer, are irradiated with laser light for recording or reproduction, in this order.

More specifically, particularly, the first recording track may be directed from one to the other side, out of the inner circumferential side and the outer circumferential side of the above-described substrate. The second recording track may be directed from the one to the other side, as with the first recording track. Namely, on the two-layer type or multi-layer type information recording medium, it is possible to perform continuous recording in a "parallel manner" in which the recording tracks are directed in the same direction between the two recording layers. In the "parallel manner", if the recording or reproduction is ended in the first recording layer, an optical pickup that is on the most outer circumference of the optical disc needs to be displaced again to the most inner circumference when the recording or reproduction is started in the second recording layer. Thus, as compared to an "opposite manner" described later, it takes more time by that much to change from the L0 layer to the L1 layer.

Particularly, according to the first information recording medium of the present invention, it is designed such that the second position is positioned on the outer circumferential side, at least only by the first offset amount, from the first position, wherein the second position indicates the start position of the data area with a pre-format address, such as a sector number, of "30000h" on the inner circumferential side of the second recording layer, and the first position indicates the start position of the data area with a sector number of "30000h" on the inner circumferential side of the first recording layer. Here, the "first offset amount" is a reference value which corresponds to a length in the radial direction, determined in order to position the most inner circumferential position of a recording area in the second recording layer, on the outer circumferential side of the most inner circumferential position of a recording area in the first recording layer. Specifically, the "first offset amount" is greater than or equal to the maximum value of an eccentricity caused by an error in pasting in the first recording layer and the second recording layer. Incidentally, the first offset amount may be shown by the length (μm) in the radial direction of the optical disc and then be possibly converted to the number of sectors and the number of ECC (Error Correcting Code) blocks. Alternatively, it may be directly shown by the number of sectors and the number of ECC blocks, which are the predetermined unit of the address.

As a result, it is possible to properly record the data in the vicinity of the start position of a recording area on the inner circumferential side in the second recording layer, with the optimum recording laser power obtained if the record data is recorded into the second recording layer through the first recording layer which is in the recorded condition. Particularly, in the vicinity of the start position of the recording area on the inner circumferential side in the second recording layer, it is unnecessary to change the recording laser power and it is enough to record the record data in accordance with the pre-format address, such as the sector number, so that there is such an advantage that a recording procedure itself is simplified. In addition, even if the recorded record data is reproduced, it is possible to obtain good reproduction features (e.g. an asymmetry value, a jitter value, degree of modulation, a reproduction error rate, and the like).

The above object of the present invention can be also achieved by a second information recording medium provided with: a first recording layer in a disc shape, in which a first recording track is formed to record thereon record information; and a second recording layer in a disc shape, in which a second recording track is formed to record thereon the record information through said first recording layer in an opposite direction as that of the first recording track in said first recording layer, a second position being positioned on an inner circumferential side, at least only by a first offset amount set in advance, from a first position, the second position being a reference of a pre-format address for indicating a start position of a data area in the second recording track, the first position being a reference of the pre-format address for indicating an end position of a data area in the first recording track.

According to the second information recording medium of the present invention, the basis structures of the first and second recording layers are substantially the same as those in the first information recording medium described above.

More specifically, particularly, the first recording track may be directed from one to the other side, out of the inner circumferential side and the outer circumferential side of the above-described substrate. As opposed to this, the second recording track may be directed from the other to the one side. Namely, on the two-layer type or multiple-layer type information recording medium, it is possible to perform continuous recording in the "opposite manner" in which the recording tracks are directed in the opposite directions between the two recording layers. Therefore, if the recording is continuously performed from the end edge of the first recording layer, i.e. an edge on the other side of the first recording layer, such as an outer circumferential end portion of the first recording layer, to the start edge of the second recording layer, i.e. an edge on the other side of the second recording layer, such as an outer circumferential end portion of the second recording layer, it is hardly necessary or not necessary at all to change the irradiation position of the laser light in the substrate surface, in the radial direction, in changing the recording layers which is the object of recording processing or reproduction processing associated with the information. This allows the quick layer-to-layer jump (i.e. a layer-to-layer changing operation). This does not need a special buffer function to change the recording layers, in recording the continuous record information, such as a movie, for example. Moreover, this facilitates the reproduction without a stop, so that it is extremely useful in practice.

Particularly, according to the second information recording medium of the present invention, it is designed such that the second position is positioned on the inner circumferential side, at least only by the first offset amount, from the first position, wherein the second position indicates the start position of the data area with a pre-format address, such as a sector number, of "E50000h" on the outer circumferential side of the second recording layer, and the first position indicates the start position of the data area with a sector number of "1AFFFFh" on the outer circumferential side of the first recording layer.

As a result, it is possible to properly record the data in the vicinity of the start position of a recording area on the outer circumferential side in the second recording layer, with the optimum recording laser power obtained if the record data is recorded into the second recording layer through the first recording layer which is in the recorded condition. Substantially in the same manner as in the first information recording medium, in the vicinity of the start position of the recording area on the outer circumferential side in the second recording layer, it is unnecessary to change the recording laser power and it is enough to record the record data in accordance with the pre-format address, such as the sector number, so that there is such an advantage that the recording procedure itself is simplified. In addition, even if the recorded record data is reproduced, it is possible to obtain good reproduction features.

In one aspect of the first and second information recording medium of the present invention, the first offset amount is set to greater than or equal to an eccentricity amount in said first recording layer and said second recording layer.

According to this aspect, it is possible to properly record the data almost without or without influence of the eccentricity in the first recording layer and the second recording layer, in the vicinity of the start position of the recording area on the inner or outer circumferential side in the second recording layer, with the optimum recording laser power obtained if the record data is recorded into the second recording layer through the first recording layer which is in the recorded condition. More specifically, for example, if the maximum value of the eccentricity in the first recording layer is 40 μm and the maximum value of the eccentricity in the second recording layer is 70 μm, the first offset amount is the summation of the maximum values of the eccentricities in the first recording layer and the second recording layer, i.e., 110 μm (=40+70). In addition, by setting the upper limit of the first offset amount to 200 μm, it is possible to comply with a DVD-ROM standard in the parallel manner.

In another aspect of the first and second information recording medium of the present invention, the first recording track and the second recording track are constructed such that a ratio of a track pitch in the second recording track to a track pitch in the said first recording track is a predetermined value which is less than 1.

According to this aspect, since the ratio of the track pitch in the second recording track to the track pitch in the said first recording track is a predetermined value which is desirably less than 1, it may be constructed such that the outer circumferential end portion which is recordable in the second recording layer is positioned on the inner circumferential side, only by a predetermined amount, from the outer circumferential end portion which is recordable in said first recording layer. Here, the "track pitch" is an interval (incidentally, whose unit is (μm/track), for example) in the radial direction of the first or second recording track of the disc-shaped information recording medium. Moreover, the "predetermined amount" is a reference value which corresponds to a length in the radial direction, determined in order to position the most outer circumferential position of a recording area in the second recording layer, on the outer circumferential side of the most outer circumferential position of a recording area in the first recording layer. Specifically, the "predetermined amount" is greater than or equal to the maximum value of the eccentricity caused by the error in pasting in the first recording layer and the second recording layer.

Particularly, according to this aspect, it may be constructed such that the outer circumferential end portion which is recordable in the second recording layer is positioned on the outer or inner circumferential side, only by another predetermined amount (e.g. a third offset amount described later), from the outer circumferential end portion which is recordable in said first recording layer.

Therefore, it is possible to accurately and quickly determine a second offset amount obtained when a series of recording operations is performed, so as to position the outer circumferential end portion which is recordable in the second recording layer, on the inner circumferential side, at least only by a predetermined amount, from the outer circumferential end portion which is recordable in said first recording layer, by virtue of an information recording apparatus described later. Here, the "second offset amount" is a reference value which corresponds to a length in the radial direction, determined in order to position the most outer circumferential position of the recording area in the second recording layer, on the inner circumferential side of the most outer circumferential position of the recording area in the first recording layer. The "second offset amount" is calculated by the information recording apparatus described later.

As a result, if the record data is alternately recorded in the first recording layer and the second recording layer, when the record data is recorded from the start position of the recording area in the second recording layer after the recording of the record data in the first recording layer, the laser light for recording goes through the first recording layer in the recorded condition, regardless of the eccentricity in the first recording layer and the second recording layer. Namely, in the recording in the second recording layer, the laser light hardly or does not go through the first recording layer in the unrecorded condition at all.

In another aspect of the first and second information recording medium of the present invention, the first recording track and the second recording track are constructed such that a difference of a track pitch in the second recording track to a track pitch in the said first recording track is a predetermined value which is negative.

According to this aspect, since the difference of the track pitch in the second recording track to the track pitch in the said first recording track is a predetermined value which is desirably negative, it may be constructed such that the outer circumferential end portion which is recordable in the second recording layer is positioned on the inner circumferential side, only by a predetermined amount, from the outer circumferential end portion which is recordable in said first recording layer.

As a result, in the recording in the second recording layer, the laser light hardly or does not go through the first recording layer in the unrecorded condition at all, in the same manner as the effect of the case where the ratio of the track pitches is adjusted, as described above.

In this aspect, the ratio or the difference may be set such that an outer circumferential end portion which is recordable in said second recording layer is positioned on an inner circumferential side, at least only by the first offset amount, from an outer circumferential end portion which is recordable in said first recording layer.

By such construction, it is possible to position the outer circumferential end portion which is recordable in said second recording layer, on the inner circumferential side, at least only by the first offset amount, from the outer circumferential end portion which is recordable in said first recording layer.

As described above, it is possible to omit the calculation of the second offset amount by the information recording apparatus described later. It is enough if the information recording apparatus performs the recording operation in accordance with the pre-format address, such as the sector number. Thus, by setting the ratio or difference of the track pitches, it is possible to realize that the laser light hardly or does not go through the first recording layer in the unrecorded condition at all, more easily, in the recording in the second recording layer.

In addition, in this aspect, at least one of the pre-format address systems of the first recording track and the second recording track may be set such that the outer circumferential end portion which is recordable in said second recording layer is positioned on the inner circumferential side, at least only by the second offset amount, from the outer circumferential end portion which is recordable in said first recording layer.

As a result, it is possible to position the outer circumferential end portion which is recordable in said second recording layer, on the inner circumferential side, at least only by the second offset amount, from the outer circumferential end portion which is recordable in said first recording layer. Moreover, it is possible to omit the calculation of the second offset amount by the information recording apparatus described later. It is enough if the information recording apparatus performs the recording operation in accordance with the pre-format address, such as the sector number. Thus, by setting the pre-format address, it is possible to realize that the laser light hardly or does not go through the first recording layer in the unrecorded condition at all, more easily, in the recording in the second recording layer.

Moreover, in this aspect, the first or second information recording medium may be further provided with a first management area in which information as for the ratio or the difference is recorded.

By such construction, it is possible to obtain the information as for the ratio or the difference, more easily and quickly, from the first management information area placed in the recording area, by the information recording apparatus described later.

In another aspect of the first or second information recording medium of the present invention, it may be further provided with a second management area in which information as for the first offset amount is recorded.

According to this aspect, the first offset amount can be obtained from the second management area placed in the recording area, and the second offset amount corresponding to the first offset amount can be determined quickly.

(Information Recording Apparatus)

The information recording apparatuses of the present invention will be explained hereinafter.

The above object of the present invention can be also achieved by a first information recording apparatus for recording a first portion of record information along a first recording track before recording a second portion of the record information along a second recording track, which is a same recording direction as the first recording track, with respect to the above-described first information recording medium, said information recording apparatus provided with: a writing device capable of writing respectively the first portion and the second portion into said first recording layer and said second recording layer; an obtaining device for obtaining information as for the first offset amount; a calculating device for calculating a second offset amount by which a position of an outer circumferential end portion which is recordable in said second recording layer is determined, on the basis of the obtained information; and a controlling device for controlling said writing device (i) to write the first portion into said first recording layer along the first recording track and (ii) to write the second portion into said second recording layer along the second recording track until the outer circumferential end portion determined by the calculated second offset amount.

According to the first information recording apparatus of the present invention, at first, the calculating device, such as a Central Processing Unit (CPU) of a drive disc or a host computer, calculates the second offset amount in the case where the first portion of the record information is recorded into the first recording layer along the first recording track, or in the case where the second portion of the record information is recorded along the second recording track, on the basis of the information as for the ratio or difference of the track pitches in the first recording layer and the second recording layer, in addition to the first offset amount obtained by the obtaining device before the recording operation.

Then, under the control of the controlling device, such as a CPU, the writing device, such as an optical pickup, for recording the record information into the first and second recording layers, (i) writes the first portion of the record information into the first recording layer along the first recording track and (ii) writes the second portion of the record information into the second recording layer along the second recording track until the outer circumferential end portion, such that the most outer circumferential position of the recording area in which the record data is recorded in the second recording layer is positioned on the inner circumferential side, only by the second offset amount, from the most outer circumferential position of the recording area in which the record data is recorded in the first recording layer.

Therefore, if the record data is alternately recorded in the first recording layer and the second recording layer, when the record data is recorded from the start position on the inner circumferential side of the recording area in the second recording layer after the recording of the record data in the first recording layer, the laser light for recording goes through the first recording layer in the recorded condition, regardless of the eccentricity in the first recording layer and the second recording layer. Namely, in the recording in the second recording layer, the laser light hardly or does not go through the first recording layer in the unrecorded condition at all.

As a result, it is possible to properly record the data in any recording area in the second recording layer, with the optimum recording laser power obtained if the record data is recorded into the second recording layer through the first recording layer which is in the recorded condition. Particularly, it is unnecessary to change the recording laser power and it is enough to record the record data in accordance with the pre-format address, such as the sector number, so that there is such an advantage that the recording procedure itself is simplified. In addition, even if the recorded record data is reproduced, it is possible to obtain good reproduction features (e.g. an asymmetry value, a jitter value, degree of modulation, a reproduction error rate, and the like).

Incidentally, even the first information recording apparatus of the present invention can adopt the same aspects as the various aspects of the first information recording medium of the present invention described above, as occasion demands.

The above object of the present invention can be also achieved by a second information recording apparatus for recording a first portion of record information along a first recording track before recording a second portion of the record information along a second recording track, which is an opposite recording direction to the first recording track, with respect to the above-described second information recording medium, said information recording apparatus provided with: a writing device capable of writing the first portion and the second portion into said first recording layer and said second recording layer; an obtaining device for obtaining information as for the first offset amount; a calculating device for calculating a second offset amount by which a position of an outer circumferential end portion which is recordable in said second recording layer is determined, on the basis of the obtained information; and a controlling device for controlling said writing device (i) to write the first portion into said first recording layer along the first recording track and (ii) to write the second portion into said second recording layer along the second recording track from the outer circumferential end portion determined by the calculated second offset amount.

According to the second information recording apparatus of the present invention, the basic structure and the operation thereof are substantially the same as those of the first information recording apparatus described above. Namely, at first, the calculating device, such as the CPU, calculates the second offset amount in the case where the first portion of the record information is recorded into the first recording layer along the first recording track, or in the case where the second portion of the record information is recorded along the second recording track, on the basis of the information as for the first offset amount or the like, which is obtained by the obtaining device before the recording operation.

Then, under the control of the controlling device, such as the CPU, the writing device, such as an optical pickup, for recording the record information into the first and second recording layers, (i) writes the first portion of the record information into the first recording layer along the first recording track and (ii) writes the second portion of the record information into the second recording layer along the second recording track from the outer circumferential end portion, such that the most outer circumferential position of the recording area in which the record data is recorded in the second recording layer is positioned on the inner circumferential side, only by the second offset amount, from the most outer circumferential position of the recording area in which the record data is recorded in the first recording layer.

Therefore, if the record data is alternately recorded in the first recording layer and the second recording layer, when the record data is recorded from the start position on the outer circumferential side of the recording area in the second recording layer after the recording of the record data in the first recording layer, the laser light for recording goes through the first recording layer in the recorded condition, regardless of the eccentricity in the first recording layer and the second recording layer. Namely, in the recording in the second recording layer, the laser light hardly or does not go through the first recording layer in the unrecorded condition at all.

As a result, as in the first information recording apparatus, it is possible to properly record the data in any recording area in the second recording layer, with the optimum recording laser power obtained if the record data is recorded into the second recording layer through the first recording layer which is in the recorded condition. Particularly, it is unnecessary to change the recording laser power and it is enough to record the record data in accordance with the pre-format address, such as the sector number, so that there is such an advantage that the recording procedure itself is simplified. In addition, even if the recorded record data is reproduced, it is possible to obtain good reproduction features.

Incidentally, even the second information recording apparatus of the present invention can adopt the same aspects as the various aspects of the second information recording medium of the present invention described above, as occasion demands.

(Information Recording Method)

The information recording methods of the present invention will be explained hereinafter.

The above object of the present invention can be also achieved by a first information recording method of recording a first portion of record information along a first recording track before recording a second portion of the record information along a second recording track, which is a same recording direction as the first recording track, with respect to the above-described first information recording medium, said information recording method provided with: an obtaining process of obtaining information as for the first offset amount; a calculating process of calculating a second offset amount by which a position of an outer circumferential end portion which is recordable in said second recording layer is determined, on the basis of the obtained information; and a controlling process of controlling a writing device (i) to write the first portion into said first recording layer along the first recording track and (ii) to write the second portion into said second recording layer along the second recording track until the outer circumferential end portion determined by the calculated second offset amount.

According to the first information recording method of the present invention, substantially as in the case of the first information recording apparatus of the present invention, it passes through the obtaining process and the calculating process, and the recording is performed with respect to the above-described first information recording medium such that the most outer circumferential position of the recording area in which the record data is recorded in the second recording layer is positioned on the inner circumferential side, only by the second offset amount, from the most outer circumferential position of the recording area in which the record data is recorded in the first recording layer, under the control of the controlling process. Therefore, if the record data is alternately recorded in the first recording layer and the second recording layer, when the record data is recorded from the start position on the inner circumferential side of the recording area in the second recording layer after the recording of the record data in the first recording layer, the laser light for recording goes through the first recording layer in the recorded condition, regardless of the eccentricity in the first recording layer and the second recording layer. Namely, in the recording in the second recording layer, the laser light hardly or does not go through the first recording layer in the unrecorded condition at all.

As a result, it is possible to properly record the data in any recording area in the second recording layer, with the optimum recording laser power obtained if the record data is recorded into the second recording layer through the first recording layer which is in the recorded condition, as in the case of the first information recording apparatus of the present invention described above.

Incidentally, even the first information recording method of the present invention can adopt the same aspects as the various aspects of the first information recording medium of the present invention described above, as occasion demands.

The above object of the present invention can be also achieved by a second information recording method of recording a first portion of record information along a first recording track before recording a second portion of the record information along a second recording track, which is an opposite recording direction to the first recording track, with respect to the above-described information recording medium, said information recording method provided with: an obtaining process of obtaining information as for the first offset amount; a calculating process of calculating a second offset amount by which a position of an outer circumferential end portion which is recordable in said second recording layer is determined, on the basis of the obtained information; and a controlling process of controlling a writing device (i) to write the first portion into said first recording layer along the first recording track and (ii) to write the second portion into said second recording layer along the second recording track from the outer circumferential end portion determined by the calculated second offset amount.

According to the second information recording method of the present invention, the recording procedure thereof is substantially the same as that of the first information recording method of the present invention described above. Therefore, if the record data is alternately recorded in the first recording layer and the second recording layer, when the record data is recorded from the start position on the outer circumferential side of the recording area in the second recording layer after the recording of the record data in the first recording layer, the laser light for recording goes through the first recording layer in the recorded condition, regardless of the eccentricity in the first recording layer and the second recording layer. Namely, in the recording in the second recording layer, the laser light hardly or does not go through the first recording layer in the unrecorded condition at all.

As a result, it is possible to properly record the data in any recording area in the second recording layer, with the optimum recording laser power obtained if the record data is recorded into the second recording layer through the first recording layer which is in the recorded condition, as in the case of the second information recording apparatus of the present invention described above.

Incidentally, even the second information recording method of the present invention can adopt the same aspects as the various aspects of the first information recording medium of the present invention described above, as occasion demands.

These effects and other advantages of the present invention will become more apparent from the following embodiments.

As explained above, according to the first and second information recording media of the present invention, the second position on the second recording track is positioned on the outer circumferential side, at least only by the first offset amount, from the first position on the first recording track. Thus, it is possible to properly record the data in the vicinity of the star position of the recording area in the second recording layer, with the optimum recording laser power, regardless of the eccentricity in the first recording layer and the second recording layer, for example.

Moreover, according to the first and second information recording apparatus of the present invention, each of the apparatuses is provided with: the obtaining device; the calculating device; and the controlling device. According to the first and second information recording method of the present invention, each of the methods is provided with: the obtaining process; the calculating process; and the controlling process. Therefore, it is possible to properly record the data in any recording area in the second recording layer, with the optimum recording laser power, regardless of the eccentricity in the first recording layer and the second recording layer, with respect to the information recording medium of the present invention.

BRIEF DESCRIPTION OF DRAWINGS

FIG. 1 are a substantial plan view showing the basic structure of an optical disc having a plurality of recording areas in a first embodiment of an information recording medium of the present invention (FIG. 1(a)), and a schematic cross sectional view of the optical disc and a corresponding conceptual diagram showing a recording area structure in the radial direction (FIG. 1(b)).

FIG. 2 is a conceptual graph schematically showing the data structure of the optical disc of a two-layer type in the first embodiment of the information recording medium of the present invention, a sector number of sectors constituting an ECC block in the recording area of the optical disc, and a recording or reproducing method in a parallel manner of the optical disc.

FIG. 3 is a conceptual graph schematically showing the data structure of the two-layer type optical disc in the first embodiment of the information recording medium of the present invention, the sector number of sectors constituting the ECC block in the recording area of the optical disc, a land pre-pit (LPP) address, and the recording or reproducing method in the parallel manner of the optical disc.

FIG. 4 is a conceptual graph schematically showing the data structure of the two-layer type optical disc in the first embodiment of the information recording medium of the present invention, the sector number of sectors constituting the ECC block in the recording area of the optical disc, and a recording or reproducing method in an opposite manner of the optical disc.

FIG. 5 is a conceptual graph schematically showing the data structure of the two-layer type optical disc in the first embodiment of the information recording medium of the present invention, the sector number of sectors constituting the ECC block in the recording area of the optical disc, the LPP address, and the recording or reproducing method in the opposite manner of the optical disc.

FIG. 6 is a conceptual diagram under the parallel manner and the opposite manner, showing the data structure of the two-layer type optical disc in the first embodiment of the information recording medium of the present invention, and the recording area shown by the sector number.

FIG. 7 is a conceptual diagram showing the recording areas shown by the sector number and the recording procedure of the optical disc in the parallel manner and the opposite manner.

FIG. 8 is a conceptual diagram showing one specific example of the recording areas after a recording operation in the parallel manner or the opposite manner, on the two-layer type optical disc in the first embodiment of the information recording medium of the present invention.

FIG. 9 is a conceptual diagram showing one specific example of recording areas after the recording operation in the parallel manner or the opposite manner, on a two-layer type optical disc in a comparison example.

FIG. 10 is a conceptual diagram showing another specific example of the recording areas after the recording operation in the parallel manner or the opposite manner, on the two-layer type optical disc in the first embodiment of the information recording medium of the present invention.

FIG. 11 is a conceptual diagram showing the data structure of the two-layer type optical disc in one specific example of the comparison example, and a recording or reproducing method in the parallel manner of the optical disc.

FIG. 12 is a conceptual diagram showing the data structure of the two-layer type optical disc in another specific example of the comparison example, and a recording or reproducing method in the opposite manner of the optical disc.

FIG. 13 is a conceptual diagram showing the data structure of the two-layer type optical disc in another specific example of the comparison example, if an eccentricity occurs due to an error in pasting of the optical disc.

FIG. 14 is a conceptual diagram showing one specific example of recording areas after the recording operation, if a track pitch in a L1 layer is adjusted, on a two-layer type optical disc in a second embodiment of the information recording medium of the present invention.

FIG. 15 is a conceptual diagram showing one specific example of the recording areas after the recording operation in the parallel manner or the opposite manner, on the two-layer type optical disc in the second embodiment of the information recording medium of the present invention.

FIG. 16 is a conceptual diagram showing another specific example of the recording areas after the recording operation in the parallel manner or the opposite manner, on the two-layer type optical disc in the second embodiment of the information recording medium of the present invention.

FIG. 17 is a conceptual diagram showing one specific example of recording areas after the recording operation in the parallel manner or the opposite manner, on a two-layer type optical disc in a second comparison example.

FIG. 18 is a conceptual diagram showing one specific example of the recording areas after the recording operation, if a track pitch in a L0 layer and a L1 layer is not controlled, on the two-layer type optical disc in the second comparison example.

FIGs. are a table (FIG. 19(a)) and a graph (FIG. 19(b)), showing a relationship among the track pitch in the L0 layer and the L1 layer, the sector number, and a difference in the radial direction of the L0 layer and the L1 layer, on the two-layer type optical disc in the second comparison example.

FIG. 20 is a conceptual diagram showing another specific example of the recording areas after the recording operation in the parallel manner or the opposite manner, on the two-layer type optical disc in the second comparison example.

FIG. 21 is a graph showing the most outer circumferential position of a data area in the L0 layer after the recording operation, if a track pitch in the L0 layer is controlled, on a two-layer type optical disc in a third embodiment of the information recording medium of the present invention.

FIG. 22 is a graph showing the most outer circumferential position of a data area in the L1 layer after the recording operation, if a track pitch in the L1 layer is controlled, on the two-layer type optical disc in the third embodiment of the information recording medium of the present invention.

FIG. 23 is a graph showing a relationship between the track pitch in the L0 layer or the L1 layer and the most outer circumferential position of the data area, on the two-layer type optical disc in the third embodiment of the information recording medium of the present invention.

FIG. 24 is a conceptual diagram showing the data structure of a two-layer type optical disc in a fourth embodiment of the information recording medium of the present invention, recording areas shown by the sector number and the LPP address, and the recording procedure of the optical disc in the parallel manner.

FIG. 25 is a conceptual diagram showing the data structure of the two-layer type optical disc in the fourth embodiment of the information recording medium of the present invention, the recording areas shown by the sector number and the LPP address, and the recording procedure of the optical disc in the opposite manner.

FIG. 26 is a conceptual diagram showing the data structure of a two-layer type optical disc in one specific example of a third comparison example, recording areas shown by the sector number and the LPP address, and the recording procedure of the optical disc in the parallel manner.

FIG. 27 is a conceptual diagram showing the data structure of the two-layer type optical disc in another specific example of the third comparison example, the recording areas shown by the sector number and the LPP address, and the recording procedure of the optical disc in the opposite manner.

FIG. 28 is a block diagram of an information recording/reproducing apparatus in an embodiment of an information recording apparatus of the present invention, as well as a host computer.

DESCRIPTION OF REFERENCE CODES

100 . . . Optical disc, 101-0 (101-1) . . . Lead-in area, 102-0 (102-1) . . . Data area, 103-0 (103-1) . . . Lead-out area, 104-0 (104-1) . . . Middle area, 300 . . . Information recording/reproducing apparatus, 306 (308) . . . Data input/output control device, 307 . . . Operation control device, 310 . . . Operation button, 311 . . . Display panel, 351 . . . Spindle motor, 352 . . . Optical pickup, 353 . . . Signal recording/reproducing device, 354 . . . CPU (drive control device), 355 (360) . . . Memory, 359 . . . CPU (for host), 400 . . . host computer, LB . . . Laser light

BEST MODE FOR CARRYING OUT THE INVENTION

Hereinafter, the best mode for carrying out the invention will be explained in each embodiment in order, with reference to the drawings.

First Embodiment of Information Recording Medium

Firstly, with reference to FIG. 1 to FIG. 13, a first embodiment of the information recording medium of the present invention will be explained in detail.

Firstly, the basic structure of an optical disc in the first embodiment of the information recording medium of the present invention will be explained with reference to FIG. 1(a) and FIG. 1(b). FIG. 1(a) is a substantial plan view showing the basic structure of an optical disc having a plurality of recording areas in a first embodiment of an information recording medium of the present invention, and FIG. 1(b) is a schematic cross sectional view of the optical disc and a corresponding conceptual diagram showing a recording area structure in the radial direction.

As shown in FIG. 1(a) and FIG. 1(b), an optical disc 100 has a recording surface on the disc main body with a diameter of about 12 cm, as is a DVD. On the recording surface, the optical disc 100 is provided with: a lead-in area 101; a data area 102; and a lead-out area 103 or a middle area 104, which are associated with the embodiment, with a center hole 1 as the center. Then, recording layers or the like are laminated on a transparent substrate 106 of the optical disc 100, for example. In each recording area of the recording layers, spirally or concentrically with the center hole 1 as the center, tracks 10, such as groove tracks and land tracks, are placed alternately. Moreover, on the track 10, data is divided by a unit of ECC block 11 and recorded. The ECC block 11 is a data management unit in which an error in the record information can be corrected.

Incidentally, the present invention is not particularly limited to the optical disc having the three areas as described above. For example, even if the lead-in area 101 and the lead-out area 103 or the middle area 104 do not exist, a data structure explained below can be constructed. Moreover, as described later, the lead-in area 101 and the lead-out area 103 or the middle area 104 may be further segmentized.

Particularly, the optical disc 100 in the first embodiment, as shown in FIG. 1(b), has such a structure that a L0 layer and a L1 layer, which constitute one example of the "first and second recording layers" of the present invention as descried later, respectively, are laminated on the transparent substrate 106. Upon the recording and reproduction of such a two-layer type optical disc 100, the recording/reproduction in the L0 layer or the L1 layer is performed, depending on which recording layer is provided with the focusing position of laser light LB, emitted from the upper to the lower side. Moreover, the optical disc 100 in the first embodiment is not limited to a two-layer, one side type, i.e., a dual layer, but may be a two-layer double side type, i.e. a dual layer double side. Furthermore, the optical disc 100 in the first embodiment is not limited to the optical disc having the two recording layers, as described above, but may be an optical disc of a multi-layer type which has three or more layers.

Incidentally, the recording or reproduction procedure of the two-layer type optical disc in an opposite manner and a parallel manner and the data structure of each layer will be described later.

Next, with reference to FIG. 2 and FIG. 3, the data structure of the two-layer type optical disc in the first embodiment of the information recording medium of the present invention, a physical sector number of physical sectors constituting an ECC block in the recording area of the optical disc, a land pre-pit address in the recording area of the optical disc, and the recording or reproduction procedure of the optical disc in the parallel manner will be explained. Here, the physical sector number (hereinafter referred to as a "sector number", as occasion demands) is position information for indicating an absolute physical address in the recording area of the optical disc. The land pre-pit address (hereinafter referred to as a "LPP address") is pre-formatted position information corresponding to the sector number. FIG. 2 is a conceptual graph schematically showing the data structure of the optical disc of a two-layer type in the first embodiment of the information recording medium of the present invention, a sector number of sectors constituting an ECC block in the recording area of the optical disc, and a recording or reproducing method in a parallel manner of the optical disc. FIG. 3 is a conceptual graph schematically showing the data structure of the two-layer type optical disc in the first embodiment of the information recording medium of the present invention, the sector number of sectors constituting the ECC block in the recording area of the optical disc, a land pre-pit (LPP) address, and the recording or reproducing method in the parallel manner of the optical disc. Incidentally, the vertical axis in FIG. 2 and FIG. 3 indicates the land pre-pit address in addition to the sector number expressed in the hexadecimal notation, and the horizontal axis indicates the relative position in the radial direction of the optical disc.

As shown in FIG. 2, the two-layer type optical disc 100 in the first embodiment of the information recording medium of the present invention is provided with two recording layers laminated on a not-illustrated substrate, i.e., the L0 layer and the L1 layer.

Specifically, the L0 layer is provided with: a lead-in area 101-0; a data area 102-0; and a lead-out area 103-0, from the inner to the outer circumferential side. The lead-in area 101-0 is provided with: a Power Calibration (PC) area PCA for Optimum Power Calibration (OPC) processing; a Recording Management (RM) area RMA in which recording management information is recorded, which is one specific example of the "first and second management areas" of the present invention; and the like.

On the other hand, the L1 layer is provided with: a lead-in area 101-1; a data area 102-1; and a lead-out area 103-1, from the inner to the outer circumferential side. The lead-in area 101-1 may be also provided with a not-illustrated PCA and the like.

Since the two-layer type optical disc 100 is constructed in the above manner, upon the recording or reproduction of the optical disc 100, the laser light LB is emitted from the not-illustrated substrate side, i.e. from the lower side in FIG. 2, to the upper side, by a not-illustrated optical pickup of an information recording/reproducing apparatus in an embodiment of the information recording apparatus of the present invention, which will be described later. Moreover, the focus distance and the like are controlled, and the displacement distance and direction in the radial direction of the optical disc 100 are controlled. By this, the data is recorded into each recording layer, or the recorded data is reproduced.

Particularly, the parallel manner may be adopted as the recording or reproduction procedure of the two-layer type optical disc in the first embodiment of the information recording medium of the present invention. In the parallel manner, when the recording or reproduction in the L1 layer is started after the recording or reproduction in the L0 layer is finished, the optical pickup that is on the most outer circumference of the optical disc needs to be displaced again to the most inner circumference, so that it takes more time by that much to change from the L0 layer to the L1 layer.

Specifically, firstly, in the L0 layer, as the optical pickup is displaced in the lead-in area 101-0, the data area 102-0, and the lead-out area 103-0, from the inner to the outer circumferential side, the sector number in the recording area of the optical disc 100 increases. More specifically, the optical pickup sequentially accesses the end position of the lead-in area 101-0 with a sector number of "02FFFFh" (refer to a position A in FIG. 2), the start position of the data area 102-0 with a sector number of "030000h" (refer to a position B in FIG. 2), and the end position of the data area 102-0 with a sector number of "1AFFFFh" (refer to a position C in FIG. 2), and is displaced to the lead-out area 103-0 which functions as a buffer. By this, the recording or reproduction in the L0 layer is performed. On the other hand, in the L1 layer, as the optical pickup is displaced in the lead-in area 101-1, the data area 102-1, and the lead-out area 103-1, from the inner to the outer circumferential side, the sector number in the recording area of the optical disc 100 increases. More specifically, the optical pickup sequentially accesses the start position of the lead-in area 101-1 which functions as a buffer, the start position of the data area 102-1 with a sector number of "030000h" (refer to the position B in FIG. 2), and the end position of the data area 102-1 with a sector number of "1AFFEFh" (refer to a position D in FIG. 2), and is displaced to the lead-out area 103-1. By this, the recording or reproduction in the L1 layer is performed.

Thus, content information is recorded or reproduced at the same time of the continuous displacement of the optical pickup from the sector number "030000h" to the sector number "1AFFFFh" of the data area 102-0 in the L0 layer and from the sector number "030000h" to the sector number "1AFFEFh" of the data area 102-1 in the L1 layer.

With respect to the sector number explained above, a Logical Block Address (LBA) is assigned, one to one. More specifically, for example, a LBA of "000000" corresponds to the sector number of "030000h" in the L0 layer, and a LBA of "17FFFF" corresponds to the sector number of "1AFFFFh". On the other hand, a LBA of "180000" corresponds to the sector number of "030000h" in the L1 layer, and a LBA of "2FFFEF" corresponds to the sector number of "1AFFEFh".

Next, with reference to FIG. 3, a relationship between the sector number and the LPP address in the parallel manner on the two-layer type optical disc in the first embodiment of the information recording medium of the present invention will be explained.

As shown in FIG. 3, the LPP address in the L0 layer and the L1 layer can be obtained from the sector number in the L0 layer and the L1 layer. More specifically, it is obtained by converting the sector number of "0030000h" in the hexadecimal notation to a binary number of "0000000000110000000000000000", inverting the bits from the fifth to the 28th bits to "1111111111001111111111111", and reconverting it to the "FFCFFFh" in the hexadecimal notation.

Moreover, it is possible to set the recording end position of the data area 102-0 (or 102-1) in the L0 layer (or the L1 layer).

Next, with reference to FIG. 4 and FIG. 5, the data structure of the two-layer type optical disc in the first embodiment of the information recording medium of the present invention, the physical sector number of physical sectors constituting the ECC block in the recording area of the optical disc, and the recording or reproduction procedure of the optical disc in the opposite manner will be explained. FIG. 4 is a conceptual graph schematically showing the data structure of the two-layer type optical disc in the first embodiment of the information recording medium of the present invention, the sector number of sectors constituting the ECC block in the recording area of the optical disc, and a recording or reproducing method in an opposite manner of the optical disc. FIG. 5 is a conceptual graph schematically showing the data structure of the two-layer type optical disc in the first embodiment of the information recording medium of the present invention, the sector number of sectors constituting the ECC block in the recording area of the optical disc, the LPP address, and the recording or reproducing method in the opposite manner of the optical disc. Incidentally, the vertical axis and the horizontal axis and the like in FIG. 4 and FIG. 5 are the same as those in FIG. 2 and FIG. 3.

As shown in FIG. 4, the two-layer type optical disc 100 in the first embodiment of the information recording medium of the present invention is provided with two recording layers laminated on a not-illustrated substrate, i.e., the L0 layer and the L1 layer.

Specifically, the L0 layer is provided with: a lead-in area 101-0; a data area 102-0; and a middle area 104-0, from the inner to the outer circumferential side. The lead-in area 101-0 is provided with: the PC area; the RM area RMA; and the like. Moreover, the middle area 104-0 has a basic function of preventing a record position or a reproduction position for the L0 layer and the L1 layer from being out of the substrate. However, the middle area 104-0 also has a function as a so-called "jump buffer area" which prevents the record position or the reproduction position from being out of the substrate at the time of the layer-to-layer jump.

On the other hand, the L1 layer is provided with: a middle area 104-1; a data area 102-1; and a lead-out area 103-1, from the inner to the outer circumferential side. The lead-out area 103-1 may be also provided with a not-illustrated PCA and the like.

Since the two-layer type optical disc 100 is constructed in the above manner, upon the recording or reproduction of the optical disc 100, the focus distance and the like are controlled in the same manner as the parallel manner described above.

Particularly, the opposite manner may be adopted as the recording or reproduction procedure of the two-layer type optical disc in the first embodiment of the information recording medium of the present invention. Here, more specifically, the opposite manner is as follows. The recording or reproduction of the two-layer type optical disc is performed in such a manner that the optical pickup of the information recording/reproducing apparatus described later is displaced from the inner to the outer circumferential side in the L0 layer, i.e. in the right direction shown with an arrow in FIG. 4, while, as opposed to the case of the L0 layer, the optical pickup is displaced from the outer to the inner circumferential side in the L1 layer, i.e. in the left direction opposite to an arrow in FIG. 4, as the reproducing or reproduction procedure of the two-layer type optical disc. In the opposite manner, if the recording or reproduction in the L0 layer is finished, when the recording or reproduction in the L1 layer is started, the optical pickup that is on the most outer circumference of the optical disc does not need to be displaced again to the most inner circumference. It is enough if the focus distance is changed from the L0 layer to the L1 layer, so that there is such an advantage that the changing time from the L0 layer to the L1 layer is shorter than that of the parallel manner. Thus, the opposite manner is adopted in the recording of the large-amount content information.

Specifically, firstly, in the L0 layer, as the optical pickup is displaced in the lead-in area 101-0, the data area 102-0, and the middle area 104-0, from the inner to the outer circumferential side, the sector number in the recording area of the optical disc 100 increases. More specifically, the optical pickup sequentially accesses the end position of the lead-in area 101-0 with a sector number of "02FFFFh" (refer to a position A in FIG. 4), the start position of the data area 102-0 with a sector number of "030000h" (refer to a position B in FIG. 4), and the end position of the data area 102-0 with a sector number of "1AFFFFh" (hereinafter referred to as a "turn-around point" in the L0 layer, as occasion demands: refer to a position C in FIG. 4), and is displaced to the middle area 104-0 which functions as a buffer. By this, the recording or reproduction in the L0 layer is performed. Incidentally, in the embodiments, "h" of the "30000h" and the like indicates that the sector number is expressed in the hexadecimal notation. On the other hand, in the L1 layer, as the optical pickup is displaced in the middle area 104-1, the data area 102-1, and the lead-out area 103-1, from the outer to the inner circumferential side, the sector number in the recording area of the optical disc 100 increases. More specifically, the optical pickup sequentially accesses the middle area 104-1 which functions as a buffer, the start position of the data area 102-1 with a sector number of "E50000h" (hereinafter referred to as a "turn-around point" in the L1 layer, as occasion demands: refer to a position D in FIG. 4), and the end position of the data area 102-1 with a sector number of "FCFFEFh" (refer to a position E in FIG. 4), and is displaced to the lead-out area 103-1. By this, the recording or reproduction in the L1 layer is performed.

All the sector numbers in the L0 layer and the L1 layer explained above have a relationship of a 15's complement in the hexadecimal notation. More specifically, the turn-around point in the L0 layer (sector number "1AFFFFh") and the turn-around point in the L1 layer (sector number "E50000h") have the relationship of the 15's complement. As a formal matter, the complement of the "1AFFFFh" is obtained by converting the sector number "1AFFFFh" in the hexadecimal notation to a binary number of "000110101111111111111111", inverting the bits to "111001010000000000000000", and reconverting it to the "E50000h" in the hexadecimal notation.

Thus, the content information is recorded or reproduced at the same time of the continuous displacement of the optical pickup from the sector number "030000h" to the sector number "1AFFFFh" of the data area 102-0 in the L0 layer and from the sector number "E50000h" to the sector number "FCFFEFh" of the data area 102-1 in the L1 layer.

With respect to the physical sector number explained above, the Logical Block Address (LBA) is assigned, one to one. More specifically, for example, a LBA of "000000" corresponds to the sector number of "030000h", and a LBA of "17FFEF" corresponds to the sector number of "1AFFFFh". Moreover, a LBA of "180000" corresponds to the sector number of "E5000h", and a LBA of "2FFFEF" corresponds to the sector number of "FCFFEFh". Thus, a host computer does not have to be aware of the physical sector number and can perform the recording operation and the reproduction operation in accordance with the logical block address LBA managed by a file system, for example.

Next, with reference to FIG. 5, a relationship between the sector number and the LPP address in the opposite manner on the two-layer type optical disc in the first embodiment of the information recording medium of the present invention will be explained.

As shown in FIG. 5, the LPP address in the L0 layer and the L1 layer can be obtained from the sector number in the L0 layer and the L1 layer, as in the parallel manner. Therefore, all of the LPP addresses in the L0 layer and the L1 layer have a relationship of a 15's complement in the hexadecimal notation, as in the case of the sector number.

Moreover, as in the parallel manner, it is possible to set the recording end position of the data area 102-0 (or 102-1) in the L0 layer (or the L1 layer).

Next, with reference to FIG. 6 and FIG. 7, the data structure of the two-layer type optical disc in the first embodiment of the information recording medium of the present invention, the recording area shown by the sector number, and the recording procedure of the optical disc in the parallel manner and the opposite manner will be explained in more detail. FIG. 6 is a conceptual diagram under the parallel manner and the opposite manner, showing the data structure of the two-layer type optical disc in the first embodiment of the information recording medium of the present invention, and the recording area shown by the sector number. FIG. 7 is a conceptual diagram showing the recording areas shown by the sector number and the recording procedure of the optical disc in the parallel manner and the opposite manner.

As shown in FIG. 6, the optical disc is designed such that the most inner circumferential position of the data area 102-1 in the L1 layer with a sector number of "30000h" (in the case of the parallel manner) or "FCFFFFh" (in the case of the opposite manner) is positioned on the outer circumferential side, only by a first offset amount, from the start position of the data area 102-0 in the L0 layer with a sector number of "30000h". Here, the "first offset amount" is a reference value which is determined in order to position the most inner circumferential position of the data area 102-1 in the L1 layer, on the outer circumferential side of the most inner circumferential position of the data area 102-0 in the L0 layer. Specifically, the "first offset amount" is the maximum value of an eccentricity caused by an error in pasting in the L0 layer and the L1 layer. More specifically, if the maximum value of an eccentricity in the L0 layer is 40 μm and the maximum value of an eccentricity in the L1 layer is 70 μm, the first offset amount is the summation of the maximum values of the eccentricities in the L0 layer and the L1 layer, i.e., 110 μm (=40+70). Moreover, by setting the upper limit of the first offset amount to 200 μm, it is possible to comply with a DVD-ROM standard in the parallel manner. Incidentally, the first offset amount may be shown by the length (μm) in the radial direction of the optical disc and then be possibly converted to the number of sectors and the number of ECC blocks. Alternatively, it may be directly shown by the number of sectors and the number of ECC blocks, which are the predetermined unit of the address.

In order to comply with the DVD-ROM standard in the parallel manner, it is necessary to set the start position of the data area 102 (the position with the sector number of "30000h"), in a range of 47.6 mm to 48.0 mm in diameter of the optical disc. Therefore, the upper limit of the first offset amount is 200 μm in radius ((48.0−47.6)÷2=0.2 mm). Thus, the start position of the data area 102-0 in the L0 layer (the position with the sector number of "30000h") may be set in a range of 47.6 mm to 47.8 mm in diameter on the optical disc. At the same time, the start position of the data area 102-1 in the L1 layer (the position with the sector number of "30000h") may be set in a range of 47.82 mm to 48.0 mm in diameter on the optical disc.

As described above, a difference in radius of the start positions of the data area 102-0 in the L0 layer and the data area 102-1 in the L1 layer (the positions with the sector number of "30000h"), i.e., the first offset amount, is preferably greater than a value of 110 μm (0.11 mm) based on the eccentricity, and is preferably less than 200 μm (0.20 mm) based on the DVD-ROM standard in the parallel manner.

As shown in FIG. 7, if the record data is alternately recorded in the L0 layer and the L1 layer, for example, the record data which is the first content data is firstly recorded into the L0 layer, and then recorded into the L1 layer (refer to gray portions in FIG. 7). In the same manner, the record data which is the second content data is firstly recorded into the L0 layer and then recorded into the L1 layer (refer to hatching portions in right diagonal lines in FIG. 7). Moreover, in the same manner, the record data which is the third content data is firstly recorded into the L0 layer and then recorded into the L1 layer (refer to dotted portions in FIG. 7).

In the parallel manner, when the record data which is the content data is recorded into the both recording layers, the recording operation is performed with respect to the optical disc in the L1 layer, in the same direction as that in the L0 layer, i.e., from the inner to the outer circumferential side. More specifically, the record data which is the first content data is firstly recorded into the L0 layer, from the recording start position of the data area 102-0 (with the sector number of "30000h"), and then recorded into the L1 layer, from the recording start position of the data area 102-1 (with the sector number of "30000h") (refer to the gray portions and a solid line with an arrow in FIG. 7). On the other hand, in the opposite manner, when the record data which is the content data is recorded into the both recording layers, the recording operation is performed with respect to the optical disc in the L1 layer, in the opposite direction as that in the L0 layer, i.e., from the outer to the inner circumferential side. More specifically, the record data which is the first content data is firstly recorded into the L0 layer, from the recording start position of the data area 102-0 (with the sector number of "30000h"), and then recorded into the L1 layer, toward the recording end position of the data area 102-1 (with the sector number of "FCFFFFh") (refer to the gray portions and a dotted line with an arrow in FIG. 7).

Particularly, with respect to the two-layer type optical disc in the first embodiment of the information recording medium of the present invention, the recording operation is performed with respect to the optical disc such that the most outer circumferential position of the data area 102-1 into which the record data will be recorded in the L1 layer is positioned on the inner circumferential side, only by a second offset amount, from the most outer circumferential position of the data area 102-0 in which the record data is recorded in the L0 layer. Here, the "second offset amount" is a reference value corresponding to the length in the radial direction, which is determined in order to position the most outer circumferential position of the data area 102-1 in the L1 layer, on the inner circumferential side of the most outer circumferential position of the data area 102-0 in the L0 layer. Specifically, the "second offset amount" is the maximum value of an eccentricity caused by an error in pasting in the L0 layer and the L1 layer, and is preferably greater than 110 μm (0.11 mm) based on the eccentricity, as in the case of the first offset amount. In addition, in the parallel manner, the second offset amount is preferably less than 200 μm (0.20 mm), in order to comply with the DVD-ROM standard. Incidentally, as in the case of the first offset amount, the second offset amount may be also shown by the length (μm) in the radial direction of the optical disc and then be possibly converted to the number of sectors and the number of ECC blocks. Alternatively, it may be directly shown by the number of sectors and the number of ECC blocks, which are the predetermined unit of the address. Moreover, in order to position the most outer circumferential position of a recording area in the L1 layer on the inner circumferential side, only by the second offset amount, from the most outer circumferential position of a recording layer in the L0 layer, in the recording operation with respect to the optical disc, it is also possible to always make the amount of the record data in the L1 layer be less than that in the L0 layer, in recording the record data alternately in the L0 layer and the L1 layer. Alternatively, it is also possible to make only the amount of the record data on the most inner circumference in the L1 layer be less than that in the L0 layer, and it is also possible to make the amount of the record data other than that on the most inner circumference in the L1 layer, be equal to that in the L0 layer.

Therefore, in the parallel manner, the recording operation is performed with respect to the optical disc such that the recording end position of the record data in the L1 layer is positioned on the inner circumferential side, only by the second offset amount, from the recording end position of the record data in the L0 layer. On the other hand, in the opposite manner, the recording operation is performed with respect to the optical disc such that the recording start position of the record data in the L1 layer is positioned on the inner circumferential side, only by the second offset amount, from the recording end position of the record data in the L0 layer.

As described above, according to the optical disc in the first embodiment of the information recording medium of the present invention, the optical disc is designed such that the most inner circumferential position of the data area 102-1 in the L1 layer with the sector number of "30000h" (in the case of the parallel manner) or "FCFFFFh" (in the case of the opposite manner) is positioned on the outer circumferential side, only by the first offset amount, from the start position of the data area 102-0 in the L0 layer with the sector number of "30000h". In addition, with respect to the optical disc in the first embodiment, the recording operation is performed such that the most outer circumferential position of the data area 102-1 into which the record data will be recorded in the L1 layer is positioned on the inner circumferential side, only by the second offset amount, from the most outer circumferential position of the data area 102-0 in which the record data is recorded in the L0 layer. Therefore, if the record data is alternately recorded in the L0 layer and the L1 layer, when the record data is recorded from the start position of the data area 102-1 in the L1 layer after the recording of the record data in the L0 layer, the laser light LB for recording goes through the L0 layer in the recorded condition, regardless of the eccentricity in the L0 layer and the L1 layer. Namely, the laser light LB hardly goes through or does not goes through the L0 layer in the unrecorded condition at all, in the recording in the L1 layer. Thus, it is possible to stabilize the reproduction features of the record data recorded at the start position of the data area 102-1 in the L1 layer.

In general, in the two-layer type optical disc, it is known that the quality of the record data recorded in the L1 layer varies depending on whether the data is recorded into the L1 layer by using the laser light emitted through the L0 layer in which the record data is already recorded or through the L0 layer in which the record data is unrecorded. Namely, there is such a technical problem that if the record data is recorded with the laser light emitted in the same condition in the above two cases, even if good recording features are obtained in one case, that does not mean that good recording features are always obtained in the other case.

On the other hand, according to the optical disc in the first embodiment, it is possible to record the record data into the L1 layer by using the laser light LB emitted through the L0 layer in which the record data is already recorded. Thus, it is possible to solve the above-described technical problem. As a result, it is possible to properly record the data into any recording area in the L1 layer, with the optimum recording laser power obtained in the case where the record data is recorded into the L1 layer through the L0 layer in which the record data is already recorded. Particularly, the record laser power is not necessarily changed, and the record data may be recorded in accordance with the pre-formatted address, such as the sector number, so that there is such an advantage that the recording operation itself is simplified. In addition, even if the recorded record data is reproduced, it is possible to obtain good reproduction features (e.g. an asymmetry value, a jitter value, degree of modulation, a reproduction error rate, and the like).

Next, with reference to FIG. 8 to FIG. 10, one specific example and another specific example of the recording areas after the recording operation with respect to the optical disc in the parallel manner or the opposite manner, on the two-layer type optical disc in the first embodiment of the information recording medium of the present invention will be explained. FIG. 8 is a conceptual diagram showing one specific example of the recording areas after a recording operation in the parallel manner or the opposite manner, on the two-layer type optical disc in the first embodiment of the information recording medium of the present invention. FIG. 9 is a conceptual diagram showing one specific example of recording areas after the recording operation in the parallel manner or the opposite manner, on a two-layer type optical disc in a comparison example. FIG. 10 is a conceptual diagram showing another specific example of the recording areas after the recording operation in the parallel manner or the opposite manner, on the two-layer type optical disc in the first embodiment of the information recording medium of the present invention. Incidentally, in FIG. 8 to FIG. 10, the address in the L1 layer shows the sector number in the parallel manner.

At first, with reference to FIG. 9 in addition to FIG. 8, as occasion demands, an explanation will be given on one specific example of the two-layer type optical disc in the first embodiment of the information recording medium of the present invention.

As shown in FIG. 8, according to the two-layer type optical disc in the first embodiment of the information recording medium of the present invention, a recording start position B of the data area 102-1 in the L1 layer (sector number: "30000h", radius 24.00 mm) is positioned on the outer circumferential side, only by the first offset amount (the width in the radial direction is 150 μm), from a recording start position A of the data area 102-0 in the L0 layer (sector number: "30000h", radius 23.85 mm). Moreover, it is constructed such that after the completion of a series of recording operations with respect to the optical disc in which the record data is alternately recorded in the L0 layer and the L1 layer, a most outer circumferential position D of the data area 102-1 in the L1 layer (sector number: "228D2Ah", radius 57.79 mm) is positioned on the inner circumferential side, only by the second offset amount (the width in the radial direction is 150 μm), from a most outer circumferential position C of the data area 102-0 in the L0 layer (sector number: "22D43Bh", radius 57.94 mm).

Particularly, according to one specific example of the two-layer type optical disc in the first embodiment of the information recording medium of the present invention, it is constructed such that in the recording operation with respect to the optical disc in which the record data is alternately recorded in the L0 layer and the L1 layer, the recording end position of the data area 102-1 in the L1 layer is always positioned on the inner circumferential side, only by the second offset amount (the width in the radial direction is 150 μm), from the recording end position of the data area 102-0 in the L0 layer. In order to realize this, the actual recording end position of the data area 102-1 in the L1 layer is determined by including the influence by the first offset amount in addition to the second offset amount. Incidentally, the determination method of determining the recording end position can be obtained experimentally, empirically, or theoretically, or by a simulation, for example.

Specifically, as described above, the recording start position B of the data area 102-1 in the L1 layer is positioned on the outer circumferential side, only by the first offset amount (the width in the radial direction is 150 μm), from the recording start position A of the data area 102-0 in the L0 layer. Thus, as shown in FIG. 9, under the recording operation with respect to the optical disc in which the second offset value is not considered, a most outer circumferential position D' of the data area 102-1 in the L1 layer (sector number: "22D43Bh", radium 58.00 mm) is positioned on the outer circumferential side, by 601 μm in the radial direction, from the most outer circumferential position C of the data area 102-0 in the L0 layer, which has the same sector number as that of the most outer circumferential position D'. In general, since the radius increases as it gets closer to the most outer circumference of the optical disc, the difference in position in the radial direction of the L0 layer and the L1 layer on the most inner circumference, which is the first offset amount (150 μm), decreases to 60 cm on the most outer circumference. Therefore, as shown in FIG. 8, the recording operation is performed with respect to the optical disc such that the actual most outer circumferential position D of the data area 102-1 in the L1 layer is positioned on the inner circumferential side, only by 210 μm (=150+60), from the position D'. In other words, the recording operation is performed with respect to the optical disc such that the sector number of the actual most outer circumferential position D is smaller than that of the position D', by a sector number of "4711h". Incidentally, the conversion method of converting from the length in the radial direction to the sector number can be obtained experimentally, empirically, or theoretically, or by a simulation, for example.

In the same manner, for example, the record data which is the first content data is firstly recorded from the recording start position A of the data area 102-0 in the L0 layer to a recording end position E in the L0 layer (sector number: "6C7E6h", radius: 29.85 mm), in the parallel manner. Then, it is recorded from the recording start position B of the data area 102-1 in the L1 layer to a recording end position F in the L1 layer (sector number: "698BFh", radius: 29.85 mm) (refer to gray portions in FIG. 8). Thus, a difference of the second offset amount (150 μm) is obtained in the radial direction at the positions E and F. In other words, the recording operation is performed with respect to the optical disc such that the sector number of the recording end position F in the L1 layer is smaller than that of the position E in the L0 layer, only by a sector number of "2F27h". Alternatively, for example, the record data which is the third content data is recorded until a recording end position G in the L0 layer (sector number: "EC5B9h", radius: 40.00 mm). Then, it is recorded until a recording end position H in the L1 layer (sector number: "E8DBFh", radius: 39.85 mm) (refer to dotted portions on a white background in FIG. 8). Thus, a difference of the second offset amount (150 μm) is obtained in the radial direction at the positions G and H. In other words, the recording operation is performed with respect to the optical disc such that the sector number of the recording end position H in the L1 layer is smaller than that of the position G in the L0 layer, only by a sector number of "37FAh".

Incidentally, even in the opposite manner, the recording area will be the same as that in the parallel manner after the completion of the recording operation with respect to the optical disc, so that the explanation will be omitted.

Next, with reference to FIG. 8 in addition to FIG. 10, as occasion demands, an explanation will be given on another specific example of the two-layer type optical disc in the first embodiment of the information recording medium of the present invention.

As shown in FIG. 10, as in substantially the same manner as the one specific example explained in FIG. 8, the recording start position B of the data area 102-1 in the L1 layer is positioned on the outer circumferential side, only by the first offset amount (the width in the radial direction is 150 μm), from the recording start position A of the data area 102-0 in the L0 layer. Moreover, it is constructed such that after the completion of the recording operation with respect to the optical disc in which the record data is alternately recorded in the L0 layer and the L1 layer, the most outer circumferential position D of the data area 102-1 in the L1 layer is positioned on the inner circumferential side, only by the second offset amount (the width in the radial direction is 150 μm), from a most outer circumferential position C of the data area 102-0 in the L0 layer.

Particularly, according to another specific example of the two-layer type optical disc in the first embodiment of the information recording medium of the present invention, the sector number of the recording end position of the data area 102-1 in the L1 layer is always made smaller than that of the recording end position of the data area 102-0 in the L0 layer, only by the second offset amount (the constant sector number), in the recording operation with respect to the optical disc in which the record data is alternately recorded in the L0 layer and the L1 layer. Incidentally, the determination method of determining the constant sector number which is the second offset amount can be obtained experimentally, empirically, or theoretically, or by a simulation, in substantially the same manner as the one specific example explained in FIG. 8. Moreover, according to another specific example, the record data may be recorded in accordance with the pre-formatted address, such as the sector number, so that there is such an advantage that the recording operation itself is simplified.

More specifically, the recording operation is performed with respect to the optical disc such that the sector number of the actual most outer circumferential position D of the data area 102-1 in the L1 layer is smaller than that of the position C of the data area 102-0 in the L0 layer, by the sector number of "4711h". As described above, if the constant sector number determined in the most outer circumferential position is the second offset amount, it is obvious that the width in the radial direction corresponding to the constant sector number increases, as it gets close to the inner circumferential side with a smaller radius.

In the same manner, for example, the record data which is the first content data is firstly recorded from the recording start position A of the data area 102-0 in the L0 layer to the recording end position E in the L0 layer, in the parallel manner. Then, it is recorded from the recording start position B of the data area 102-1 in the L1 layer to a recording end position I in the L1 layer (sector number: "680D5h", radius: 29.71 mm) (refer to gray portions in FIG. 10). Namely, the recording operation is performed with respect to the optical disc such that the sector number of the recording end position I in the L1 layer is smaller than that of the position E in the L0 layer, only by a sector number of "4711h". Thus, a difference of 290 μm which is larger than the second offset amount (150 μm) is obtained at the positions E and I in the radial direction. Alternatively, for example, the record data which is the third content data is recorded until the recording end position G in the L0 layer. Then, it is recorded until a recording end position J in the L1 layer (sector number: "E7EA8h", radius: 39.79 mm) (refer to dotted portions on a white background in FIG. 10). Namely, the recording operation is performed with respect to the optical disc such that the sector number of the recording end position J in the L1 layer is smaller than that of the position G in the L0 layer, only by a sector number of "4711h". Thus, a difference of 210 μm which is larger than of the second offset amount (150 μm) is obtained in the radial direction at the positions G and J.

Incidentally, even in the opposite manner, the recording area will be the same as that in the parallel manner after the completion of the recording operation with respect to the optical disc, so that the explanation will be omitted.

Study of Operation and Effect of First Embodiment of Information Recording Medium Next, with reference to FIG. 11 to FIG. 13 which show a comparison example, the operation and effect of the first embodiment of the information recording medium of the present invention will be studied. FIG. 11 is a conceptual diagram showing the data structure of the two-layer type optical disc in one specific example of the comparison example, and a recording or reproducing method in the parallel manner of the optical disc. FIG. 12 is a conceptual diagram showing the data structure of the two-layer type optical disc in another specific example of the comparison example, and a recording or reproducing method in the opposite manner of the optical disc. FIG. 13 is a conceptual diagram showing the data structure of the two-layer type optical disc in another specific example of the comparison example, if an eccentricity occurs due to an error in pasting of the optical disc.

As shown in FIG. 11 and FIG. 12, in the parallel manner and the opposite manner associated with the comparison example, if the record data is alternately recorded in the L0 layer and the L1 layer, the recording operation is performed with respect to the optical disc such that the most outer circumferential position of the data area 102-1 into which the record data will be recorded in the L1 layer is positioned on the inner circumferential side, only by the second offset amount, from the most outer circumferential position of the data area 102-0 in which the record data is recorded in the L0 layer. Therefore, if the record data is recorded from the start position of the data area 102-1 in the L1 layer in the comparison example, the laser light LB for recording may go through the L0 layer which is in the recorded condition. More specifically, for example, the record data which is the first content data is firstly recorded into the L0 layer, and then recorded into the L1 layer (refer to gray portions in FIG. 11 and FIG. 12). In the same manner, refer to hatching portions in right diagonal lines and dotted portions in FIG. 11 and in FIG. 12, with respect to the second and third content data, respectively. This may stabilize the reproduction features of the record data recorded in the data area 102-1 in the L1 layer.

However, as shown in FIG. 13, in the comparison example, the eccentricity occurs due to the error in pasting in the L0 layer and the L1 layer. Moreover, if the most inner circumferential position of the data area 102-1 in the L1 layer with the sector number of "30000h" (in the case of the parallel manner) or "FCFFFFh" (in the case of the opposite manner) is positioned on the inner circumferential side, from the start position of the data area 102-0 in the L0 layer with the sector number of "30000h", the laser light LB for recording goes through the L0 layer which is in the unrecorded condition. This destabilizes the reproduction features of the record data recorded in the most inner circumferential position of the data area 102-1 in the L1 layer.

On the other hand, according to the optical disc in the first embodiment of the information recording medium of the present invention, the optical disc is designed such that the most inner circumferential position of the data area 102-1 in the L1 layer with the sector number of "30000h" (in the case of the parallel manner) or "FCFFFFh" (in the case of the opposite manner) is positioned on the outer circumferential side, only by the first offset amount, from the start position of the data area 102-0 in the L0 layer with the sector number of "30000h". In addition, with respect to the optical disc in the first embodiment, the recording operation is performed such that the most outer circumferential position of the data area 102-1 into which the record data will be recorded in the L1 layer is positioned on the inner circumferential side, only by the second offset amount, from the most outer circumferential position of the data area 102-0 in which the record data is recorded in the L0 layer. Therefore, if the record data is alternately recorded in the L0 layer and the L1 layer, when the record data is recorded from the most inner circumferential position of the data area 102-1 in the L1 layer after the recording of the record data in the L0 layer, the laser light LB for recording goes through the L0 layer in the recorded condition, regardless of the eccentricity in the L0 layer and the L1 layer. Namely, the laser light LB hardly goes through or does not goes through the L0 layer in the unrecorded condition at all, in the recording in the L1 layer. As a result, it is possible to properly record the data in any recording area in the L1 layer, with the optimum recording laser power in the case where the record data is recorded into the L1 layer through the L0 layer in which the record data is already recorded. Particularly, it is unnecessary to change the recording laser power and it is enough to record the record data in accordance with the pre-format address, such as the sector number, so that there is such an advantage that the recording procedure itself is simplified. In addition, even if the recorded record data is reproduced, it is possible to obtain good reproduction features.

Second Embodiment of Information Recording Medium

Next, with reference to FIG. 14 to FIG. 16, the data structure of a two-layer type optical disc, which is a second embodiment of the information recording medium of the present invention, recording areas shown by the sector number, and the recording procedure of the optical disc will be explained in detail. FIG. 14 is a conceptual diagram showing one specific example of recording areas after the recording operation, if a track pitch in a L1 layer is adjusted, on a two-layer type optical disc in a second embodiment of the information recording medium of the present invention. FIG. 15 is a conceptual diagram showing one specific example of the recording areas after the recording operation in the parallel manner or the opposite manner, on the two-layer type optical disc in the second embodiment of the information recording medium of the present invention. FIG. 16 is a conceptual diagram showing another specific example of the recording areas after the recording operation in the parallel manner or the opposite manner, on the two-layer type optical disc in the second embodiment of the information recording medium of the present invention. Incidentally, in FIG. 14 to FIG. 16, the address in the L1 layer shows the sector number in the parallel manner.

The data structure and the recording procedure in the second embodiment of the information recording medium of the present invention are substantially the same as those in the first embodiment. Incidentally, in the recording areas in the second embodiment, the same positions as those in the first embodiment carry the same reference numerals, and the explanations of them are omitted.

At first, with reference to FIG. 14 and FIG. 15, an explanation will be given on one specific example of the two-layer type optical disc in the second embodiment of the information recording medium of the present invention.

As shown in FIG. 14, a track pitch in the L1 layer is adjusted, on the optical disc in the second embodiment of the information recording medium of the present invention. Therefore, if the recording operation is performed with respect to the optical disc, the most outer circumferential position of the data area 102-1 in the L1 layer is positioned on the outer circumferential side, only by a third offset amount, from the most outer circumferential position of the data area 102-0 in the L0 layer, which has the same sector number as that of the data area 102-1 in the L1 layer. Here, the "third offset amount" is a reference value which corresponds to a length in the radial direction, determined in order to position the most outer circumferential position of the data area 102-1 in the L1 layer, within a predetermined range, from the most outer circumferential position of the data area 102-0 in the L0 layer, when the recording operation is performed with respect to the optical disc, by adjusting the ratio or difference of the track pitches in the L0 layer and the L1 layer with respect to the optical disc. Moreover, the recording operation is performed with respect to the optical disc on which the track pitch in the L1 layer is adjusted in the second embodiment, and it is constructed such that a most outer circumferential position K of the data area 102-1 in the L1 layer (sector number: "22D43Bh", radium 58.14 mm) is positioned on the outer circumferential side, only by 200 μm at most, for example, as the third offset value in the radial direction, from the above-described most outer circumferential position C of the data area 102-0 in the L0 layer, which has the same sector number as that of the most outer circumferential position K. Incidentally, in the second embodiment of the information recording medium of the present invention, the track pitch in the L1 layer is adjusted, for convenience of explanation, however, the ratio or difference of the track pitches in the L0 layer and the L1 layer may be adjusted.

Therefore, as shown in FIG. 15, according to one specific example of the two-layer type optical disc in the second embodiment of the information recording medium of the present invention, if the record data is alternately recorded in the L0 layer and the L1 layer, it is constructed such that the recording end position of the data area 102-1 in the L1 layer is always positioned on the inner circumferential side, only by the second offset amount (the width in the radial direction of 150 μm), from the recording end position of the data area 102-0 in the L0 layer. Thus, the actual recording end position of the data area 102-1 in the L1 layer is determined, including the third offset amount, in addition to the second offset amount, by an information recording apparatus described later. Incidentally, the determination method of determining the recording end position by considering the third offset amount can be obtained experimentally, empirically, or theoretically, or by a simulation, in substantially the same manner as in the first embodiment.

More specifically, the recording operation is performed with respect to the optical disc such that an actual most outer circumferential position L of the data area 102-1 in the L1 layer is positioned on the inner circumferential side, only by 350 μm (=200+150), from the position K. In other words, the recording operation is performed with respect to the optical disc such that the sector number of the actual most outer circumferential position L of the data area 102-1 in the L1 layer is smaller than that of the position K, by a sector number of "75BBh". As a result, the sector number of the most outer circumferential position L of the data area 102-1 in the L1 layer becomes "225E80h", and the radius thereof becomes 57.79 mm. As compared to one specific example of the two-layer type optical disc in the first embodiment of the information recording medium of the present invention explained in FIG. 8, it is seen that the sector number of the position L is small by that the track pitch in the L1 layer is large.

In the same manner, for example, the record data which is the first content data is firstly recorded from the recording start position A of the data area 102-0 in the L0 layer to the recording end position E in the L0 layer, in the parallel manner. Then, it is recorded from the recording start position B of the data area 102-1 in the L1 layer to a recording end position M in the L1 layer (sector number: "6935Eh", radius: 29.85 mm) (refer to gray portions in FIG. 15). Thus, a difference of the second offset amount (150 μm) is obtained in the radial direction at the positions E and M. In other words, the recording operation is performed with respect to the optical disc such that the sector number of the recording end position M in the L1 layer is smaller than that of the position E in the L0 layer, only by a sector number of "3488h". Alternatively, for example, the record data which is the third content data is recorded until the recording end position G in the L0 layer. Then, it is recorded until a recording end position N in the L1 layer (sector number: "E7CA8h", radius: 39.85 mm) (refer to dotted portions on a white background in FIG. 15). Thus, a difference of the second offset amount (150 μm) is obtained in the radial direction at the positions G and N. In other words, the recording operation is performed with respect to the optical disc such that the sector number of the recording end position N in the L1 layer is smaller than that of the position G in the L0 layer, only by a sector number of "4911h".

Incidentally, even in the opposite manner, the recording area will be the same as that in the parallel manner after the completion of the recording operation with respect to the optical disc, so that the explanation will be omitted.

Next, with reference to FIG. 15, as occasion demands, in addition to FIG. 16, an explanation will be given on another specific example of the two-layer type optical disc in the second embodiment of the information recording medium of the present invention.

As shown in FIG. 16, the track pitch in the L1 layer is controlled, in substantially the same manner as the one specific example explained in FIG. 15.

Therefore, as shown in FIG. 16, according to another specific example of the two-layer type optical disc in the second embodiment of the information recording medium of the present invention, in the recording operation with respect to the optical disc on which the record data is alternately recorded in the L0 layer and the L1 layer, it is constructed such that the sector number of the recording end position of the data area 102-1 in the L1 layer is always smaller than that of the recording end position of the data area 102-0 in the L0 layer, only by the second offset amount (the constant sector number). Incidentally, the determination method of determining the constant sector number which is the second offset amount can be obtained experimentally, empirically, or theoretically, or by a simulation, in substantially the same manner as the one specific example explained in FIG. 15. Moreover, according to another specific example in the second embodiment, the record data may be recorded in accordance with the pre-formatted address, such as the sector number, so that there is such an advantage that the recording operation itself is simplified.

More specifically, the recording operation is performed with respect to the optical disc such that the sector number of the actual most outer circumferential position L of the data area 102-1 in the L1 layer is smaller than that of the most outer circumferential position C of the data area 102-0 in the L0 layer, by a sector number of "75BBh". As described above, if the constant sector number determined in the most outer circumferential position is the second offset amount, it is obvious that the width in the radial direction corresponding to the constant sector number increases, as it gets close to the inner circumferential side on which the radium is smaller.

In the same manner, for example, the record data which is the first content data is firstly recorded from the recording start position A of the data area 102-0 in the L0 layer to the recording end position E in the L0 layer, in the parallel manner. Then, it is recorded from the recording start position B of the data area 102-1 in the L1 layer to a recording end position O (sector number: "6522Bh", radius: 29.47 mm) (refer to gray portions in FIG. 16). Namely, the recording operation is performed with respect to the optical disc such that the sector number of the recording end position O in the L1 layer is smaller than that of the position E in the L0 layer, only by a sector number of "75BBh". Thus, a difference of 530 μm which is larger than the second offset amount (150 μm) is obtained at the positions E and O in the radial direction. Alternatively, for example, the record data, which is the third content data, is recorded until the recording end position G in the L0 layer. Then, it is recorded until a recording end position P in the L1 layer (sector number: "E4FFEh", radius: 39.66 mm) (refer to dotted portions on a white background in FIG. 16). Namely, the recording operation is performed with respect to the optical disc such that the sector number of the recording end position P in the L1 layer is smaller than that of the position G in the L0 layer, only by a sector number of "75BBh". Thus, a difference of 340 μm which is larger than of the second offset amount (150 μm) is obtained in the radial direction at the positions G and P.

Incidentally, even in the opposite manner, the recording area will be the same as that in the parallel manner after the completion of the recording operation with respect to the optical disc, so that the explanation will be omitted.

Study of Operation and Effect of Second Embodiment of Information Recording Medium Next, with reference to FIG. 17 to FIG. 20 which show a comparison example, the operation and effect of the second embodiment of the information recording medium of the present invention will be studied. FIG. 17 is a conceptual diagram showing one specific example of recording areas after the recording operation in the parallel manner or the opposite manner, on a two-layer type optical disc in a second comparison example. FIG. 18 is a conceptual diagram showing one specific example of the recording areas after the recording operation, if a track pitch in a L0 layer and a L1 layer is not controlled, on the two-layer type optical disc in the second comparison example. FIGs. are a table (FIG. 19(*a*)) and a graph (FIG. 19(*b*)), showing a relationship among the track pitch in the L0 layer and the L1 layer, the sector number, and a difference in the radial direction of the L0 layer and the L1 layer, on the two-layer type optical disc in the second comparison example. FIG. 20 is a conceptual diagram showing another specific example of the recording areas after the recording operation in the parallel manner or the opposite manner, on the two-layer type optical disc in the second comparison example. Incidentally, the address in the L1 layer shows the sector number in the parallel manner.

As shown in FIG. 17, according to one specific example of the two-layer-type optical disc associated with the second comparison example, the track pitches in the L0 layer and the L1 layer are not controlled. Namely, the third offset amount is not considered. Thus, in the recording operation with respect to the optical disc on which the record data is alternately recorded in the L0 layer and the L1 layer, it is impossible to always position the recording end position of the data area 102-1 in the L1 layer, on the inner circumferential side, only by the second offset amount (the width in the radial direction of 150 μm), from the recording end position of the data area 102-0 in the L0 layer. Namely, the recording end position of the data area 102-1 in the L1 layer is positioned on the outer circumferential side, only by 170 μm in width in the radial direction, from the recording end position of the data area 102-0 in the L0 layer.

Specifically, as shown in FIG. 18, if the track pitches in the L0 layer and the L1 layer are not controlled, and if the track pitch in the L0 layer is 0.74 μm and the track pitch in the L1 layer is 0.75 μm, a most outer circumferential position Q of the data area 102-1 in the L1 layer (sector number: "22D43Bh", radium 58.32 mm) is positioned on the outer circumferential side, by 380 μm in the radial direction, from the most outer circumferential position C of the data area 102-0 in the L0 layer, which has the same sector number as that of the most outer circumferential position Q. Incidentally, this 380 μm can be estimated by adding 60 μm, which is explained in FIG. 9, to a difference of the radial positions of 0.318 mm with a sector number (the address value) of "220000h" in FIG. 19(*a*) and FIG. 19(*b*).

Again, as shown in FIG. 17, in one specific example of the second comparison example, the recording operation is performed with respect to the optical disc such that the actual most outer circumferential position R of the data area 102-1 in the L1 layer is positioned on the inner circumferential side, only by 210 μm (150+60), from the position Q, as in the one specific example of the first embodiment explained in FIG. 8. In other words, the recording operation is performed with respect to the optical disc such that the sector number of the actual most outer circumferential position R of the data area 102-1 in the L1 layer is smaller than that of the position Q, only by a sector number of "4711h". As a result, the sector number of the most outer circumferential position R becomes "228D2Ah" and the radius thereof becomes 58.11 mm. Namely, the recording end position of the data area 102-1 in the L1 layer is positioned on the outer circumferential side, only by 170 μm (=380−210) in width in the radial direction, from the recording end position of the data area 102-0 in the L0 layer.

In the same manner, for example, the record data which is the first content data is firstly recorded from the recording start position A of the data area 102-0 in the L0 layer to the recording end position E in the L0 layer, in the parallel manner. Then, it is recorded from the recording start position B of the data area 102-1 in the L1 layer to a recording end position S in the L1 layer (sector number: "698BFh", radius: 29.92 mm) (refer to gray portions in FIG. 17). Thus, a difference of the radial positions at the positions E and S is 80 μm, and it is impossible to ensure a difference of the second offset amount (150 μm). Alternatively, for example, the record data which is the third content data is recorded until the recording end position G in the L0 layer. Then, it is recorded until a recording end position T in the L1 layer (sector number: "E8DBFh", radius: 40.02 mm) (refer to dotted portions on a white background in FIG. 17). Thus, a difference of the radial positions at the positions G and T is −20 μm, and it is impossible to ensure a difference of the second offset amount (150 μm).

Incidentally, even in the opposite manner, the recording area will be the same as that in the parallel manner after the completion of the recording operation with respect to the optical disc, so that the explanation will be omitted.

On the other hand, as shown in FIG. 20, in another specific example of the second comparison example, the recording operation is performed with respect to the optical disc such that the sector number of the actual most outer circumferential position R of the data area 102-1 in the L1 layer is smaller than that of the most outer circumferential position C of the data area 102-0 in the L0 layer, only by a sector number of "4711h", in substantially the same manner as in the another example of the first embodiment explained in FIG. 10. As a result, the sector number of the most outer circumferential position R of the data area 102-1 in the L1 layer becomes "228D2Ah", and the radius thereof becomes 58.11 mm. Namely, the recording end position of the data area 102-1 in the L1 layer is positioned on the outer circumferential side, only by 170 μm in width in the radial direction, from the recording end position of the data area 102-0 in the L0 layer.

In the same manner, for example, the record data which is the first content data is firstly recorded from the recording start position A of the data area 102-0 in the L0 layer to the recording end position E in the L0 layer, in the parallel manner. Then, it is recorded from the recording start position B of the data area 102-1 in the L1 layer to a recording end position U in the L1 layer (sector number: "680D5h", radius: 29.78 mm) (refer to gray portions in FIG. 20). Namely, the recording operation is performed such that the sector number of the recording end position U in the L1 layer is smaller than that of the position E, by a sector number of "4711h". Thus, a difference of 220 μm is obtained at the radial positions of the positions E and U. Namely, a difference of the second offset amount (150 μm) is obtained. However, for example, the record data which is the third content data is recorded until the recording end position G in the L0 layer. Then, it is recorded until a recording end position W in the L1 layer (sector number: "E7EA8h", radius: 39.96 mm) (refer to dotted portions on a white background in FIG. 20). Namely, the recording operation is performed such that the sector number of the recording end position W in the L1 layer is smaller than that of the position G, by a sector number of "4711h". Thus, a difference of the radial positions of the positions G and W becomes 401 μm, and it is impossible to ensure a difference of the second offset amount (150 μm).

Incidentally, even in the opposite manner, the recording area will be the same as that in the parallel manner after the completion of the recording operation with respect to the optical disc, so that the explanation will be omitted.

Third Embodiment of Information Recording Medium

Next, with reference to FIG. 21 to FIG. 23, a more detailed explanation will be given on a relationship between the control of the track pitches in the L0 layer and the L1 layer on a two-layer type optical disc and the most outer circumferential positions in the L0 layer and the L1 layer, which is a third embodiment of the information recording medium of the present invention. FIG. 21 is a graph showing the most outer circumferential position of a data area in the L0 layer after the recording operation, if a track pitch in the L0 layer is controlled, on a two-layer type optical disc in a third embodiment of the information recording medium of the present invention. FIG. 22 is a graph showing the most outer circumferential position of a data area in the L1 layer after the recording operation, if a track pitch in the L1 layer is controlled, on the two-layer type optical disc in the third embodiment of the information recording medium of the present invention. FIG. 23 is a graph showing a relationship between the track pitch in the L0 layer or the L1 layer and the most outer circumferential position of the data area, on the two-layer type optical disc in the third embodiment of the information recording medium of the present invention.

The data structure and the recording procedure in the third embodiment of the information recording medium of the present invention are substantially the same as in the first embodiment.

As shown at positions Ax, Bx, and Cx in FIG. 21 and FIG. 22, on the optical disc in the third embodiment of the information recording medium of the present invention, the track pitches in the L0 layer and the L1 layer are controlled, and the most outer circumferential position of the data area 102-1 in the L1 layer is positioned on the inner circumferential side, only by the first offset amount (150 μm), from the most outer circumferential position of the data area 102-0 in the L0 layer. Therefore, if the recording operation is performed with respect to the optical disc in the most outer circumferential position in the L1 layer, it is possible to omit the recording operation to make a buffer area, such as the lead-out area, for example, only by the second offset amount (150 μm), in the L0 layer.

Specifically, focusing on the position Ax in FIG. 21 and FIG. 22, if the track pitch in the L0 layer is set to be about 0.7465 μm, the most outer circumferential position of the data area 102-0 in the L0 layer becomes 58.150 mm. On the other hand, if the track pitch in the L1 layer is set to be about 0.740 μm, the most outer circumferential position of the data area 102-1 in the L1 layer becomes 58.000 mm.

Thus, it is possible that the most outer circumferential position of the data area 102-1 in the L1 layer is positioned on the inner circumferential side, only by the first offset amount (150 μm=0.150 mm=58.150−58.000), from the most outer circumferential position of the data area 102-0 in the L0 layer.

Moreover, focusing on the position Bx in FIG. 21 and FIG. 22, if the track pitch in the L0 layer is set to be about 0.740 μm, the most outer circumferential position of the data area 102-0 in the L0 layer becomes 57.938 mm. On the other hand, if the track pitch in the L1 layer is set to be about 0.7335 μm, the most outer circumferential position of the data area 102-1 in the L1 layer becomes 57.788 mm.

Thus, it is possible that the most outer circumferential position of the data area 102-1 in the L1 layer is positioned on the inner circumferential side, only by the first offset amount (150 μm=0.150 mm=57.938−57.788), from the most outer circumferential position of the data area 102-0 in the L0 layer.

Moreover, focusing on the position Cx in FIG. 21 and FIG. 22, if the track pitch in the L0 layer is set to be about 0.7433 μm, the most outer circumferential position of the data area 102-0 in the L0 layer becomes 58.044 mm. On the other hand, if the track pitch in the L1 layer is set to be about 0.7367 μm, the most outer circumferential position of the data area 102-1 in the L1 layer becomes 57.894 mm.

Thus, it is possible that the most outer circumferential position of the data area 102-1 in the L1 layer is positioned on the inner circumferential side, only by the first offset amount (150 μm=0.150 mm=58.044−57.894), from the most outer circumferential position of the data area 102-0 in the L0 layer.

As described above, according to the third embodiment of the information recording medium of the present invention, if the recording operation is performed with respect to the optical disc in the most outer circumferential position in the L1 layer, it is possible to omit the recording operation to make the buffer area, such as the lead-out area, for example, only by the second offset amount (150 μm), in the L0 layer.

Incidentally, even in the opposite manner, the control of the track pitches will obtain the same effect at the most inner circumferential position of the data area as the most outer circumferential position in the parallel manner, so that the explanation will be omitted.

Moreover, according to the research by the inventors of the present invention, as shown in FIG. 23, it is found out that the relationship between the track pitch in the L0 layer or the L1 layer and the most outer circumferential position in the data area is shown by a curve of second degree, not by a linear function.

Fourth Embodiment of Information Recording Medium

Next, with reference to FIG. 24 and FIG. 27, a more detailed explanation will be given on the data structure of a two-layer type optical disc, recording areas shown by the sector number and the LPP address, and the recording procedure in the parallel manner or the opposite manner of the optical disc, in a fourth embodiment of the information recording medium of the present invention, including the study of the operation and effect thereof. FIG. 24 is a conceptual diagram showing the data structure of a two-layer type optical disc in a fourth embodiment of the information recording medium of the present invention, recording areas shown by the sector number and the LPP address, and the recording procedure of the optical disc in the parallel manner. FIG. 25 is a conceptual diagram showing the data structure of the two-layer type optical disc in the fourth embodiment of the information recording medium of the present invention, the recording areas shown by the sector number and the LPP address, and the recording procedure of the optical disc in the opposite manner. FIG. 26 is a conceptual diagram showing the data structure of a two-layer type optical disc in one specific example of a third comparison example, recording areas shown by the sector number and the LPP address, and the recording procedure of the optical disc in the parallel manner. FIG. 27 is a conceptual diagram showing the data structure of the two-layer type optical disc in another specific example of the third comparison example, the recording areas shown by the sector number and the LPP address, and the recording procedure of the optical disc in the opposite manner.

The data structure and the recording procedure in the fourth embodiment of the information recording medium of the present invention are substantially the same as those in the first embodiment.

As shown in FIG. 24, according to one specific example of the optical disc in the fourth embodiment of the information recording medium of the present invention, in the parallel manner, the pre-format address of the optical disc is set with an offset such that the start position of the data area 102-1 in the L1 layer (sector number: "30000h", LPP address: "FFCFFFh", radium 24.00 mm), is positioned on the outer circumferential side, only by the first offset amount (150 μm), from the start position of the data area 102-0 in the L0 layer (sector number: "30000h", LPP address: "FFCFFFh", radium 23.85 mm). Namely, the position of the LPP address "FFCFFFh" in the L0 layer is not equal to that of the LPP address "FFCFFFh" in the L1 layer, which indicates the position is offset. In addition, the pre-format address of the optical disc is set such that the most outer circumferential position of the data area 102-1 in the L1 layer in which the record data is recorded (sector number: "22D440h", LPP address: "FDD2BBh", radium 58.00 mm), is positioned on the inner circumferential side, only by the second offset amount (150 μm), from the most outer circumferential position of the data area 102-0 in the L0 layer in which the record data is recorded (sector number: "231C20h", LPP address: "FDCE3Dh", radium 58.15 mm).

Moreover, as shown in FIG. 25, according to another specific example of the optical disc in the fourth embodiment of the information recording medium of the present invention, in the opposite manner, the pre-format address of the optical disc is set such that the most inner circumferential position of the data area 102-1 in the L1 layer in which the record data is recorded (sector number: "FCB81Fh", LPP address: "00347Eh", radium 24.00 mm), is positioned on the outer circumferential side, only by the first offset amount (150 μm), from the start position of the data area 102-0 in the L0 layer (sector number: "30000h", LPP address: "FFCFFFh", radium 23.85 mm). In addition, the pre-format address of the optical disc is set such that the start position of the data area 102-1 in the L1 layer in which the record data is recorded (sector number: "DCE3DFh", LPP address: "0231C2h", radium 58.00 mm), is positioned on the inner circumferential side, only by the second offset amount (150 μm), from the most outer circumferential position of the data area 102-0 in the L0 layer in which the record data is recorded (sector number: "231C20h", LPP address: "FDCE3Dh", radium 58.15 mm). Namely, the position of the LPP address "0231C2h" in the L0 layer is not equal to that of the LPP address "FDCE3Dh" in the L1 layer, which indicates the position is offset.

As described above, according to the fourth embodiment of the information recording medium of the present invention, even if there is the eccentricity on the disc, the data area 102-1 in the L1 layer is narrower than the data area 102-0 in the L0 layer. Thus, if the recording operation is performed from the recording start position in the L1 layer, it is possible to omit the recording operation to make the buffer area, such as the lead-in area, only by the first offset amount, in the L0 layer, for example. At the same time, if the recording operation is performed in the most outer circumferential position in the L1 layer, it is possible to omit the recording operation to make the buffer area, such as the lead-in area and the middle area, only by the second offset amount, in the L0 layer, for example. Particularly, in the recording operation in real time, such as a case where broadcasting contents are directly recorded onto the optical disc, there is no time to record the data into the lead-in area, the lead-out area, and the middle area. Thus, the possibility of omitting the recording operation as in the fourth embodiment of the information recording medium of the present invention is extremely useful.

If the pre-format address is not set as in the fourth embodiment of the information recording medium of the present invention, the most inner circumferential position and the most outer circumferential position are the same in the L0 layer and the L1 layer, as shown in FIG. 26 and FIG. 27. By this, in the parallel manner and the opposite manner, the recording operation is required to make the buffer area, such as the lead-in area, on the inner circumferential side from the start position of the data area 102-1 in the L0 layer (sector number: "30000h", LPP address: "FFCFFFh", radius: 24.00 mm), only by the first offset amount (150 μm). Moreover, the recording operation is required to make the buffer area, such as the lead-out area and the middle area, on the outer circumferential side from the most outer circumferential position of the data area 102-1 in the L0 layer in which the record data is recorded (sector number: "22D440h", LPP address: "FDD2BBh", radius: 58.00 mm), only by the second offset amount (150 μm).

On the other hand, according to the fourth embodiment of the information recording medium of the present invention, as described above, the data area 102-1 in the L1 layer is narrower than the data area 102-0 in the L0 layer, so that it is possible to omit the recording operation to make the buffer area, such as the lead-in area, the lead-out area, and the middle area.

(Information Recording Apparatus)

Next, with reference to FIG. 28, the basic structures of an information recording/reproducing apparatus 300 and a host computer 400 in the embodiment of an information recording apparatus of the present invention will be explained. Particularly, in the embodiment, the information recording apparatus of the present invention is applied to the information recording/reproducing apparatus for the optical disc. FIG. 28 is a block diagram of an information recording/reproducing apparatus in an embodiment of an information recording apparatus of the present invention, as well as a host computer. Incidentally, the information recording/reproducing apparatus 300 has a function of recording the record data onto the optical disc 100 and a function of reproducing the record data recorded on the optical disc 100.

The internal structure of the information recording/reproducing apparatus 300 will be explained with reference to FIG. 28. The information recording/reproducing apparatus 300 is an apparatus for recording the information onto the optical disc 100 and reading the information recorded on the optical disc 100, under the control of a Central Processing Unit (CPU) 354 for a drive.

The information recording/reproducing apparatus 300 is provided with: the optical disc 100; a spindle motor 351; an optical pickup 352; a signal recording/reproducing device 353; the CPU (drive control device) 354; a memory 355; a data input/output control device 306; and a bus 357. Moreover, the host computer 400 is provided with: a CPU 359; a memory 360; an operation control device 307; an operation button 310; a display panel 311; and a data input/output control device 308.

Particularly, a communication device may be constructed by including the information recording/reproducing apparatus 300 and the host computer 400 in the same case, or by using the CPU (drive control device) 354, the data input/output control device 306, and the bus 357.

The spindle motor 351 is intended to rotate and stop the optical disc 100, and operates in accessing the optical disc 100. More specifically, the spindle motor 351 is constructed to rotate and stop the optical disc 100 at a predetermined speed while receiving spindle servo by a not-illustrated servo unit or the like.

The optical pickup 352 performs the recording/reproducing with respect to the optical disc 100, and is provided with a semiconductor laser apparatus and a lens. More specifically, the optical pickup 352 irradiates the optical disc 100 with a light beam, such as a laser beam, as reading light with a first power upon reproduction, and as writing light with a second power upon recording, with it modulated.

The signal recording/reproducing device 353 performs the recording/reproducing with respect to the optical disc 100 by controlling the spindle motor 351 and the optical pickup 352. More specifically, the signal recording/reproducing device 353 is provided with a laser diode (LD) driver, a head amplifier, and the like. The LD driver drives the not-illustrated semiconductor laser apparatus built in the optical pickup 352. The head amplifier amplifies the output signal of the optical pickup 352, i.e., the reflected light of the light beam, and outputs the amplified signal. More specifically, the signal recording/reproducing device 353 drives the not-illustrated semiconductor laser apparatus built in the optical pickup 352, so as to determine the optimum laser power by the recording and reproduction process of a n OPC pattern, along with a not-illustrated timing generator, under the control of the CPU 354, in the OPC processing. Particularly, the signal recording i reproducing device 353 constitutes one example of the "writing device" and the "obtaining device" of the present invention, with the optical pickup 352.

The memory 355 is used in the whole data processing and the OPC processing on the information recording/reproducing apparatus 300, including a buffer area for the record/reproduction data, an area used as an intermediate buffer when data is converted into the data that can be used on the signal recording/reproducing device 353, and the like. Moreover, the memory 355 is provided with: a Read Only Memory (ROM) area into which a program for performing an operation as a recording device, i.e., firmware is stored; a buffer for temporarily storing the record/reproduction data; a Random Access Memory (RAM) area into which a parameter required for the operation of the firmware program or the like is stored; and the like.

The CPU (drive control device) 354 is connected to the signal recording/reproducing device 353 and the memory 355 via the bus 357, and controls the entire information recording/reproducing apparatus 300 by giving instructions to various devices. In general, software or firmware for operating the CPU 354 is stored in the memory 355. Particularly, the CPU 354 constitutes one example of the "controlling device" and the "calculating device" of the present invention.

The data input/output control device 306 controls the data input/output from the outside with respect to the information recording/reproducing apparatus 300, and stores the data into or extracts it from the data buffer on the memory 355. A drive control command, which is issued from the external host computer 400 (hereinafter referred to as a host, as occasion demands) connected to the information recording/reproducing apparatus 300 via an interface, such as a SCSI (Small Computer System Interface) and an ATAPI (AT Attachment Packet Interface), is transmitted to the CPU 354 through the data input/output control device 306. Moreover, the record/reproduction data is also exchanged with the host computer 400 through the data input/output control device 306.

The operation control device 307 performs the reception of the operation instruction and display with respect to the host computer 400. The operation control device 307 sends the instruction of recording or reproducing by using the operation bottom 310, to the CPU 359. The CPU 359 sends a control command to the information recording/reproducing apparatus 300 through the input/output control device 308 on the basis of the instruction information from the operation control device 307, to thereby control the entire information recording/reproducing apparatus 300. In the same manner, the CPU 359 can send a command of requiring the information recording/reproducing apparatus 300 to send the operation condition to the host, to the information recording/reproducing apparatus 300. By this, it is possible to recognize the operation condition of the information recording/reproducing apparatus 300, such as during recording and during reproduction. Thus, the CPU 359 can output the operation condition of the information recording/reproducing apparatus 300, to the display panel 311, such as a fluorescent tube and a LCD, through the operation control device 307.

One specific example in which the information recording/reproducing apparatus 300 and the host computer 400, as explained above, are used together is household equipment, such as recorder equipment for recording/reproducing a video. The recorder equipment records a video signal from a broadcast reception tuner and an external connection terminal, onto a disc, and outputs the video signal reproduced from the disc, to external display equipment, such as a television. The operation as the recorder equipment is performed by executing a program stored in the memory 360, on the CPU 359. Moreover, in another specific example, the information recording/reproducing apparatus 300 is a disc drive (hereinafter referred to as a drive, as occasion demands), and the host computer 400 is a personal computer or a workstation. The host computer, such as the personal computer, and the drive are connected to each other through the data input/output control devices 306 and 308, such as the SCSI and the ATAPI. An application, such as writing software, which is installed in the host computer, controls the disc drive.

In the embodiments, as one specific example of the information recording medium, for example, the write-once-type or rewritable optical disc, such as a two-layer type DVD-R/RW, is explained. The present invention, however, can be applied to an optical disc of a multiple-layer type, such as a three-layer type. Moreover, it can be applied to a large-capacity recording medium, such as a disc, in which a blue laser is used for the recording and reproduction.

The present invention is not limited to the above-described embodiments, and various changes may be made, if desired, without departing from the essence or spirit of the invention which can be read from the claims and the entire specification. An information recording medium, an information recording apparatus, and an information recording method, which involve such changes, are also intended to be within the technical scope of the present invention.

INDUSTRIAL APPLICABILITY

The information recording medium, and the information recording apparatus and method according to the present invention can be applied to a high-density recording medium, such as a DVD and a CD, for example, and also applied to an information recording apparatus, such as a DVD recorder.

The invention claimed is:

1. An information recording apparatus for recording a first portion of record information along a first recording track before recording a second portion of the record information along a second recording track, which is a same recording direction as the first recording track, with respect to an information recording medium, said information recording medium comprising:

a first recording layer in a disc shape, in which the first recording track is formed to record thereon the record information; and a second recording layer in a disc shape, in which the second recording track is formed to record thereon the record information through said first recording layer in a same direction as that of the first recording track in said first recording layer, a position indicated by a second address in the second recording track, obtained by converting a first address in a predetermined operation, being positioned on an outer circumferential side, at least only by a first offset amount set in advance, from a position indicated by the first address pre-formatted in the first recording track;

said information recording apparatus comprising:

a writing device capable of writing respectfully the first portion and the second portion into said first recording layer and said second recording layer;

an obtaining device for obtaining information as for the first offset amount;

a calculating device for calculating a second offset amount by which a position of an outer circumferential end portion which is recordable in said second recording layer is determined, on the basis of the obtained information; and a controlling device for controlling said writing device (i) to write the first position into said first recording layer along the first recording track and (ii) to write the second portion into said second recording layer along the second recording track until the outer circumferential end portion determined by the calculated second offset amount.

2. An information recording apparatus for recording a first portion of record information along a first recording track before recording a second portion of the record information along a second recording track, which is an opposite recording direction to the first recording track, with respect to an information recording medium, said information recording medium comprising:

a first recording layer in a disc shape, in which the first recording track is formed to record thereon the record information; and a second recording layer in a disc shape, in which the second recording track is formed to record thereon the record information through said first recording layer in an opposite direction as that of the first recording track in said first recording layer, a position indicated by a second address in the second recording track, obtained by converting a first address in a predetermined operation, being positioned on an inner circumferential side, at least only by a first offset amount set in advance, from a position indicated by the first address pre-formatted in the first recording track;

said information recording apparatus comprising:

a writing device capable of writing respectfully the first portion and the second portion into said first recording layer and said second recording layer;

an obtaining device for obtaining information as for the first offset amount;

a calculating device for calculating a second offset amount by which a position of an outer circumferential end portion which is recordable in said second recording layer is determined, on the basis of the obtained information; and a controlling device for controlling said writing device (i) to write the first portion into said first recording layer along the first recording track and (ii) to write the second portion into said second recording layer along the second recording track from the outer circumferential end portion determined by the calculated second offset amount.

3. An information recording method of recording a first portion of record information along a first recording track before recording a second portion of the record information along a second recording track, which is a same recording direction as the first recording track, with respect to an information recording medium, said information recording medium comprising:

a first recording layer in a disc shape, in which the first recording track is formed to record thereon the record information; and a second recording layer in a disc shape, in which the second recording track is formed to record thereon the record information through said first recording layer in a same direction as that of the first recording track in said first recording layer, a position indicated by a second address in the second recording track, obtained by converting a first address in a predetermined operation, being positioned on an outer circumferential side, at least only by a first offset amount set in advance, from a position indicated by the first address pre-formatted in the first recording track;

said information recording method comprising:

an obtaining process of obtaining information as for the first offset amount;

a calculating process of calculating a second offset amount by which a position of an outer circumferential end portion which is recordable in said second recording layer is determined, on the basis of the obtained information; and a controlling process of controlling a writing device (i) to write the first portion into said first recording layer along the first recording track and (ii) to write the second portion into said second recording layer along the second recording track until the outer circumferential end portion determined by the calculated second offset amount.

4. An information recording method of recording a first portion of record information along a first recording track before recording a second portion of the record information along a second recording track, which is an opposite recording direction to the first recording track, with respect to an information recording medium, said information recording medium comprising:

a first recording layer in a disc shape, in which the first recording track is formed to record thereon the record information; and a second recording layer in a disc shape, in which the second recording track is formed to record thereon the record information through said first recording layer in an opposite direction as that of the first recording track in said first recording layer, a position indicated by a second address in the second recording track, obtained by converting a first address in a predetermined operation, being positioned on an inner circumferential side, at least only by a first offset amount set in advance, from a position indicated by the first address pre-formatted in the first recording track;

said information recording method comprising:

an obtaining process of obtaining information as for the first offset amount;

a calculating process of calculating a second offset amount by which a position of an outer circumferential end portion which is recordable in said second recording layer is determined, on the basis of the obtained information; and a controlling process of controlling a writing device (i) to write the first portion into said first recording layer along the first recording track and (ii) to write the second portion into said second recording layer along the second recording track from the outer circumferential end portion determined by the calculated second offset amount.

* * * * *